(12) United States Patent
Dutta

(10) Patent No.: US 11,509,575 B2
(45) Date of Patent: Nov. 22, 2022

(54) SELECTION OF A TRANSPORT PROTOCOL FOR SUPPORTING A LABEL DISTRIBUTION PROTOCOL

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/990,610

(22) Filed: Aug. 11, 2020

(65) Prior Publication Data

US 2022/0052946 A1 Feb. 17, 2022

(51) Int. Cl.
*H04L 45/50* (2022.01)
*H04L 45/02* (2022.01)
*H04L 69/163* (2022.01)

(52) U.S. Cl.
CPC ............ *H04L 45/507* (2013.01); *H04L 45/02* (2013.01); *H04L 69/163* (2013.01)

(58) Field of Classification Search
CPC ..... H04L 45/507; H04L 45/02; H04L 69/163; H04L 45/50; H04L 45/724; H04L 47/76
See application file for complete search history.

(56) References Cited

U.S. PATENT DOCUMENTS

| | | | | |
|---|---|---|---|---|
| 7,606,235 | B1 * | 10/2009 | Ayyangar | H04L 45/00 370/395.21 |
| 7,668,116 | B2 * | 2/2010 | Wijnands | H04L 45/16 370/254 |
| 7,843,917 | B2 * | 11/2010 | Brockners | H04L 45/00 370/389 |

(Continued)

FOREIGN PATENT DOCUMENTS

EP 2 317 719 A1 5/2011

OTHER PUBLICATIONS

Andersson, L., et al., "LDP Specification," Network Working Group, RFC 5036, Oct. 2007, 135 pages.

(Continued)

*Primary Examiner* — Chandrahas B Patel
(74) *Attorney, Agent, or Firm* — Tong, Rea, Bentley & Kim, LLC

(57) ABSTRACT

Various example embodiments for supporting selection of a transport protocol for use in supporting a label distribution protocol in a label switching network are presented. Various example embodiments for supporting selection of a transport protocol for use in supporting a label distribution protocol in a label switching network may be configured to support multiple transport protocol options for use in supporting use of the label distribution protocol between a pair of label (Continued)

ALPN NEGOTIATION EXTENSION
710

```
enum {
    application_layer_protocol_negotiation(16), (65535)
} ExtensionType;
```

The "extension_data" field of the ("application_layer_protocol_negotiation(16)") extension SHALL contain a "ProtocolNameList" value.

```
opaque ProtocolName<1..2^8-1>;

struct {
    ProtocolName protocol_name_list<2..2^16-1>
} ProtocolNameList;
```

MLPN NEGOTIATION EXTENSION
720

```
enum {
    multi_layer_protocol_negotiation(20), (65535)
} ExtensionType;
```

The "extension_data" field of the ("multi_layer_protocol_negotiation(16)") extension contains a "MultiLayerProtocolList" value.

```
opaque LayerName<1..2^8-1>;

struct {
    uint_16    protocol_list<2..2^16-1>;
} ProtocolList;

struct {
    LayerName    layer_name;
    ProtocolList    protocols;
} LayerProtocolList;

struct {
    LayerProtocolList layer_protocol_list <2..2^16-1>
} MultiLayerProtocolList;
``` switched routers in the label switching network. Various example embodiments for supporting selection of a transport protocol for use in supporting a label distribution protocol in a label switching network may be configured to use the selected transport protocol to support various aspects of the label distribution protocol (e.g., establishment of a label distribution protocol session based on the label distribution protocol, label distribution based on the label distribution protocol, and so forth).

28 Claims, 7 Drawing Sheets

(56) References Cited

U.S. PATENT DOCUMENTS

| | | | | |
|---|---|---|---|---|
| 8,230,047 | B2* | 7/2012 | Pibhai | H04L 41/22 709/220 |
| 9,025,442 | B2* | 5/2015 | Sasidharan Pillai | H04L 45/50 370/225 |
| 9,729,455 | B2* | 8/2017 | Kompella | H04L 47/825 |
| 10,218,611 | B2* | 2/2019 | Easale | H04L 47/18 |
| 10,979,316 | B2* | 4/2021 | Pasupathy | H04L 41/5019 |
| 2004/0114595 | A1 | 6/2004 | Doukai | |
| 2014/0310388 | A1 | 10/2014 | Djukic et al. | |

OTHER PUBLICATIONS

Postel, J., "User Datagram Protocol," Internet Standard, RFC 768, Aug. 28, 1980, 3 pages.
Information Sciences Institute, Univ. of So. California, "Transmission Control Protocol," DARPA Internet Program, Protocol Specification, RFC 793, Sep. 1981, 89 pages.
Stewart, R., "Stream Control Transmission Protocol," Network Working Group, RFC 4960, Sep. 2007, 152 pages.
Iyengar, J., et al., "QUIC: A UDP-Based Multiplexed and Secure Transport," Internet Draft, draft-ietf-quic-transport-29, Jun. 10, 2020, 187 pages.
Nokia Solutions and Networks Oy, U.S. Appl. No. 16/911,980, filed Jun. 25, 2020, 73 pages.
Friedl, S., "Transport Layer Security (TLS, Application-Layer Protocol Negotiation Extension," RFC 7301, Jul. 2014, 9 pages.
Iana, "IEEE 802 Numbers," https://www.iana.org/assignments/ieee-802-numbers/ieee-802-numbers.xhtml, printed on Aug. 11, 2020, 16 pages.
Iana, "Protocol Numbers," https://www.iana.org/assignments/protocol-numbers/protocol-numbers.xhtml, printed on Aug. 11, 2020, 11 pages.
Iana, "Service Name and Transport Protocol Port Number Registry," https://www.iana.org/assignments/service-names-port-numbers/service-names-port-numbers.xhtml, printed on Aug. 11, 2020, 4 pages.
European Search Report mailed in corresponding EP 21190502.1 dated Jan. 18, 2022, 8 pages.

* cited by examiner

FIG. 2

TRANSPORT PREFERENCES TLV
200

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0| Transport Prefs.(0x0976) |            Length              |
+-+-+-+-+-+-+-+-+-+-+-+-+-+-+-+-+-+-+-+-+-+-+-+-+-+-+-+-+-+-+-+-+
|                      Transport Element 1                      |
+-+-+-+-+-+-+-+-+-+-+-+-+-+-+-+-+-+-+-+-+-+-+-+-+-+-+-+-+-+-+-+-+
|                                                               |
~                                                               ~
|                                                               |
+-+-+-+-+-+-+-+-+-+-+-+-+-+-+-+-+-+-+-+-+-+-+-+-+-+-+-+-+-+-+-+-+
|                      Transport Element n                      |
+-+-+-+-+-+-+-+-+-+-+-+-+-+-+-+-+-+-+-+-+-+-+-+-+-+-+-+-+-+-+-+-+
```

FIG. 3

GENERIC TRANSPORT ELEMENT
300

```
 0                   1
 0 1 2 3 4 5 6 7 8 9 0 1 2 3 4 5
+-+-+-+-+-+-+-+-+-+-+-+-+-+-+-+-+
|   Type(0x1)   | Protocol Type |
+-+-+-+-+-+-+-+-+-+-+-+-+-+-+-+-+
```

FIG. 4

TRANSPORT PREFERENCES TLV
400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0| Transport Prefs.(0x0976) |            Length              |
+-+-+-+-+-+-+-+-+-+-+-+-+-+-+-+-+-+-+-+-+-+-+-+-+-+-+-+-+-+-+-+-+
|                      Transport Bit String                     |
+-+-+-+-+-+-+-+-+-+-+-+-+-+-+-+-+-+-+-+-+-+-+-+-+-+-+-+-+-+-+-+-+
```

FIG. 7

ALPN NEGOTIATION EXTENSION 710 

```
enum {
    application_layer_protocol_negotiation(16), (65535)
} ExtensionType;
```

The "extension_data" field of the ("application_layer_protocol_negotiation(16)") extension SHALL contain a "ProtocolNameList" value.

```
opaque ProtocolName<1..2^8-1>;

struct {
    ProtocolName protocol_name_list<2..2^16-1>
} ProtocolNameList;
```

MLPN NEGOTIATION EXTENSION 720 

```
enum {
    multi_layer_protocol_negotiation(20), (65535)
} ExtensionType;
```

The "extension_data" field of the ("multi_layer_protocol_negotiation(16)") extension contains a "MultiLayerProtocolList" value.

```
opaque LayerName<1..2^8-1>;

struct {
    uint_16    protocol_list<2..2^16-1>;
} ProtocolList;

struct {
    LayerName       layer_name;
    ProtocolList    protocols;
} LayerProtocolList;

struct {
    LayerProtocolList   layer_protocol_list <2..2^16-1>
} MultiLayerProtocolList;
```

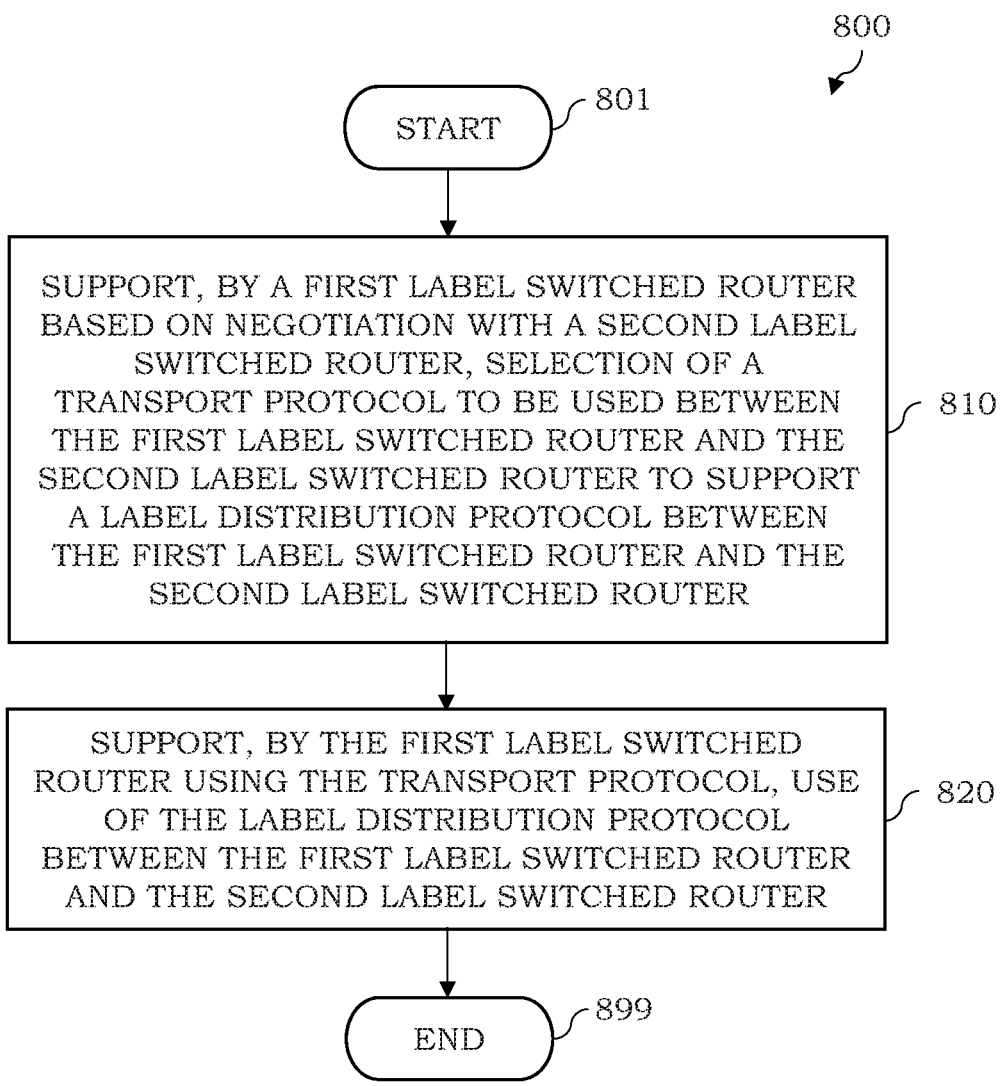

SELECTION OF A TRANSPORT PROTOCOL FOR SUPPORTING A LABEL DISTRIBUTION PROTOCOL

TECHNICAL FIELD

Various example embodiments relate generally to communication systems and, more particularly but not exclusively, to supporting selection of a transport protocol for use in supporting a label distribution protocol in a label switching network.

BACKGROUND

In many communication networks, various communications technologies may be used to support various communications which may be supported using various protocols.

SUMMARY

In at least some example embodiments, an apparatus includes at least one processor and at least one memory including a set of instructions, wherein the set of instructions is configured to, when executed by the at least one processor, cause the apparatus to support, by a first label switched router based on negotiation with a second label switched router, selection of a transport protocol to be used between the first label switched router and the second label switched router to support a label distribution protocol between the first label switched router and the second label switched route and support, by the first label switched router using the transport protocol, use of the label distribution protocol between the first label switched router and the second label switched router. In at least some example embodiments, to support selection of the transport protocol, the set of instructions is configured to, when executed by the at least one processor, cause the apparatus to support, by the first label switched router, communication of an indication of a set of transport protocols available for supporting the label distribution protocol between the first label switched router and the second label switched router. In at least some example embodiments, the indication of the set of transport protocols includes a list of the transport protocols available for supporting the label distribution protocol between the first label switched router and the second label switched router. In at least some example embodiments, the list of transport protocols available for supporting the label distribution protocol between the first label switched router and the second label switched router is configured to indicate a prioritized ordering of the transport protocols available for supporting the label distribution protocol between the first label switched router and the second label switched router. In at least some example embodiments, the indication of the set of transport protocols is included within a type-length-value (TLV) including a set of transport element fields encoding respective indications of the respective transport protocols available for supporting the label distribution protocol between the first label switched router. In at least some example embodiments, the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router. In at least some example embodiments, the indication of the set of transport protocols is included within a type-length-value (TLV) including a field that includes the bit string. In at least some example embodiments, the indication of the set of transport protocols is communicated within an adjacency message of the label distribution protocol. In at least some example embodiments, to support communication of the indication of the set of transport protocols available for supporting the label distribution protocol between the first label switched router and the second label switched router, the set of instructions is configured to, when executed by the at least one processor, cause the apparatus to send, by the first label switched router toward the second label switched router, an indication of a set of transport protocols available at the first label switched router for supporting the label distribution protocol between the first label switched router and the second label switched router. In at least some example embodiments, to support communication of the indication of the set of transport protocols available for supporting the label distribution protocol between the first label switched router and the second label switched router, the set of instructions is configured to, when executed by the at least one processor, cause the apparatus to receive, by the first label switched router from the second label switched router, an indication of a set of transport protocols available at the second label switched router for supporting the label distribution protocol between the first label switched router and the second label switched router. In at least some example embodiments, to support selection of the transport protocol, the set of instructions is configured to, when executed by the at least one processor, cause the apparatus to select, by the first label switched router based on a set of transport protocols supported by the first label switched router and a set of transport protocols supported by the second label switched router, the transport protocol to be used between the first label switched router and the second label switched router to support the label distribution protocol between the first label switched router and the second label switched router. In at least some example embodiments, the transport protocol to be used between the first label switched router and the second label switched router is selected, from a set of common transport protocols supported by the first label switched router and the second label switched router, as a highest priority transport protocol indicated by one of the first label switched router or the second label switched router having a lower label distribution protocol identifier. In at least some example embodiments, to select the transport protocol, the set of instructions is configured to, when executed by the at least one processor, cause the apparatus to determine, by the first label switched router based on the set of transport protocols supported by the first label switched router and the set of transport protocols supported by the second label switched router, a set of common transport protocols supported by the first label switched router and the second label switched router and determine, by the first label switched router based on the set of common transport protocols supported by the first label switched router and the second label switched router, the transport protocol to be used between the first label switched router and the second label switched router to support the label distribution protocol between the first label switched router and the second label switched router. In at least some example embodiments, to determine the transport protocol, the set of instructions is configured to, when executed by the at least one processor, cause the apparatus to determine, by the first label switched router based on a first router identifier of the first label switched router and a second router identifier of the second label switched router, a label switched router having a lower label distribution protocol identifier and determine, from the set of common transport protocols supported by the first label switched router and the second label switched router, a highest priority transport protocol of the label switched router having the lower label distribution protocol identifier. In at least some example embodiments, to support use of the label distribution protocol between the first label switched router and the second label switched router, the set of instructions is configured to, when executed by the at least one processor, cause the apparatus to support, by the first label switched router using the transport protocol, establishment of a transport connection between the first label switched router and the second label switched router. In at least some example embodiments, to support establishment of the transport connection between the first label switched router and the second label switched router, the set of instructions is configured to, when executed by the at least one processor, cause the apparatus to negotiate, by the first label switched router during the establishment of the transport connection, that application data to be transported on the transport connection includes label distribution protocol data of the label distribution protocol. In at least some example embodiments, to negotiate that the application data to be transported on the transport connection includes label distribution protocol data of the label distribution protocol, the set of instructions is configured to, when executed by the at least one processor, cause the apparatus to support use of a transport protocol port number that is assigned for the transport protocol to indicate use of the label distribution protocol. In at least some example embodiments, to support use of the label distribution protocol between the first label switched router and the second label switched router, the set of instructions is configured to, when executed by the at least one processor, cause the apparatus to support, by the first label switched router using a transport connection of the transport protocol and based on the label distribution protocol, establishment of a label distribution protocol session between the first label switched router and the second label switched router. In at least some example embodiments, to support establishment of the label distribution protocol session between the first label switched router and the second label switched router, the set of instructions is configured to, when executed by the at least one processor, cause the apparatus to support, by the first label switched router using the transport connection and based on the label distribution protocol, communication of a label distribution session establishment message of the label distribution protocol. In at least some example embodiments, to support use of the label distribution protocol between the first label switched router and the second label switched router, the set of instructions is configured to, when executed by the at least one processor, cause the apparatus to support, by the first label switched router using a transport connection of the transport protocol and based on a label distribution protocol session established between the first label switched router and the second label switched router based on the label distribution protocol, communication of a label distribution session message of the label distribution protocol between the first label switched router and the second label switched router. In at least some example embodiments, to support use of the label distribution protocol between the first label switched router and the second label switched router, the set of instructions is configured to, when executed by the at least one processor, cause the apparatus to support, by the first label switched router on a transport connection of the transport protocol, a set of streams of the transport connection, the set of streams of the transport connection configured to transport a respective set of label distribution protocol sessions of the label distribution protocol. In at least some example embodiments, the label distribution protocol sessions of the label distribution protocol are associated with respective feature sets to be supported between the first label switched router and the second label switched router. In at least some example embodiments, the feature sets to be supported between the first label switched router and the second label switched router are associated with respective Forwarding Equivalence Classes (FECs). In at least some example embodiments, to support use of the label distribution protocol between the first label switched router and the second label switched router, the set of instructions is configured to, when executed by the at least one processor, cause the apparatus to support, by the first label switched router on a transport connection of the transport protocol, a first stream configured to transport a first label distribution protocol session associated with a first set of features to be supported between the first label switched router and the second label switched router and support, by the first label switched router on the transport connection, a second stream configured to transport a second label distribution protocol session associated with a second set of features to be supported between the first label switched router and the second label switched router. In at least some example embodiments, the transport protocol includes a Transmission Control Protocol (TCP), a Stream Control Transmission Protocol (SCTP), a QUIC protocol, or a Transport Layer Security (TLS) protocol. In at least some example embodiments, the label distribution protocol includes a Label Distribution Protocol (LDP).

In at least some example embodiments, a non-transitory computer-readable medium stores a set of instructions configured to cause an apparatus to support, by a first label switched router based on negotiation with a second label switched router, selection of a transport protocol to be used between the first label switched router and the second label switched router to support a label distribution protocol between the first label switched router and the second label switched route and support, by the first label switched router using the transport protocol, use of the label distribution protocol between the first label switched router and the second label switched router. In at least some example embodiments, to support selection of the transport protocol, the set of instructions is configured to cause the apparatus to support, by the first label switched router, communication of an indication of a set of transport protocols available for supporting the label distribution protocol between the first label switched router and the second label switched router. In at least some example embodiments, the indication of the set of transport protocols includes a list of the transport protocols available for supporting the label distribution protocol between the first label switched router and the second label switched router. In at least some example embodiments, the list of transport protocols available for supporting the label distribution protocol between the first label switched router and the second label switched router is configured to indicate a prioritized ordering of the transport protocols available for supporting the label distribution protocol between the first label switched router and the second label switched router. In at least some example embodiments, the indication of the set of transport protocols is included within a type-length-value (TLV) including a set of transport element fields encoding respective indications of the respective transport protocols available for supporting the label distribution protocol between the first label switched router and the second label switched router. In at least some example embodiments, the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router. In at least some example embodiments, the indication of the set of transport protocols is included within a type-length-value (TLV) including a field that includes the bit string. In at least some example embodiments, the indication of the set of transport protocols is communicated within an adjacency message of the label distribution protocol. In at least some example embodiments, to support communication of the indication of the set of transport protocols available for supporting the label distribution protocol between the first label switched router and the second label switched router, the set of instructions is configured to cause the apparatus to send, by the first label switched router toward the second label switched router, an indication of a set of transport protocols available at the first label switched router for supporting the label distribution protocol between the first label switched router and the second label switched router. In at least some example embodiments, to support communication of the indication of the set of transport protocols available for supporting the label distribution protocol between the first label switched router and the second label switched router, the set of instructions is configured to cause the apparatus to receive, by the first label switched router from the second label switched router, an indication of a set of transport protocols available at the second label switched router for supporting the label distribution protocol between the first label switched router and the second label switched router. In at least some example embodiments, to support selection of the transport protocol, the set of instructions is configured to cause the apparatus to select, by the first label switched router based on a set of transport protocols supported by the first label switched router and a set of transport protocols supported by the second label switched router, the transport protocol to be used between the first label switched router and the second label switched router to support the label distribution protocol between the first label switched router and the second label switched router. In at least some example embodiments, the transport protocol to be used between the first label switched router and the second label switched router is selected, from a set of common transport protocols supported by the first label switched router and the second label switched router, as a highest priority transport protocol indicated by one of the first label switched router or the second label switched router having a lower label distribution protocol identifier. In at least some example embodiments, to select the transport protocol, the set of instructions is configured to cause the apparatus to determine, by the first label switched router based on the set of transport protocols supported by the first label switched router and the set of transport protocols supported by the second label switched router, a set of common transport protocols supported by the first label switched router and the second label switched router and determine, by the first label switched router based on the set of common transport protocols supported by the first label switched router and the second label switched router, the transport protocol to be used between the first label switched router and the second label switched router to support the label distribution protocol between the first label switched router and the second label switched router. In at least some example embodiments, to determine the transport protocol, the set of instructions is configured to cause the apparatus to determine, by the first label switched router based on a first router identifier of the first label switched router and a second router identifier of the second label switched router, a label switched router having a lower label distribution protocol identifier and determine, from the set of common transport protocols supported by the first label switched router and the second label switched router, a highest priority transport protocol of the label switched router having the lower label distribution protocol identifier. In at least some example embodiments, to support use of the label distribution protocol between the first label switched router and the second label switched router, the set of instructions is configured to cause the apparatus to support, by the first label switched router using the transport protocol, establishment of a transport connection between the first label switched router and the second label switched router. In at least some example embodiments, to support establishment of the transport connection between the first label switched router and the second label switched router, the set of instructions is configured to cause the apparatus to negotiate, by the first label switched router during the establishment of the transport connection, that application data to be transported on the transport connection includes label distribution protocol data of the label distribution protocol. In at least some example embodiments, to negotiate that the application data to be transported on the transport connection includes label distribution protocol data of the label distribution protocol, the set of instructions is configured to cause the apparatus to support use of a transport protocol port number that is assigned for the transport protocol to indicate use of the label distribution protocol. In at least some example embodiments, to support use of the label distribution protocol between the first label switched router and the second label switched router, the set of instructions is configured to cause the apparatus to support, by the first label switched router using a transport connection of the transport protocol and based on the label distribution protocol, establishment of a label distribution protocol session between the first label switched router and the second label switched router. In at least some example embodiments, to support establishment of the label distribution protocol session between the first label switched router and the second label switched router, the set of instructions is configured to cause the apparatus to support, by the first label switched router using the transport connection and based on the label distribution protocol, communication of a label distribution session establishment message of the label distribution protocol. In at least some example embodiments, to support use of the label distribution protocol between the first label switched router and the second label switched router, the set of instructions is configured to cause the apparatus to support, by the first label switched router using a transport connection of the transport protocol and based on a label distribution protocol session established between the first label switched router and the second label switched router based on the label distribution protocol, communication of a label distribution session message of the label distribution protocol between the first label switched router and the second label switched router. In at least some example embodiments, to support use of the label distribution protocol between the first label switched router and the second label switched router, the set of instructions is configured to cause the apparatus to support, by the first label switched router on a transport connection of the transport protocol, a set of streams of the transport connection, the set of streams of the transport connection configured to transport a respective set of label distribution protocol sessions of the label distribution protocol. In at least some example embodiments, the label distribution protocol sessions of the label distribution protocol are associated with respective feature sets to be supported between the first label switched router and the second label switched router. In at least some example embodiments, the feature sets to be supported between the first label switched router and the second label switched router are associated with respective Forwarding Equivalence Classes (FECs). In at least some example embodiments, to support use of the label distribution protocol between the first label switched router and the second label switched router, the set of instructions is configured to cause the apparatus to support, by the first label switched router on a transport connection of the transport protocol, a first stream configured to transport a first label distribution protocol session associated with a first set of features to be supported between the first label switched router and the second label switched router and support, by the first label switched router on the transport connection, a second stream configured to transport a second label distribution protocol session associated with a second set of features to be supported between the first label switched router and the second label switched router. In at least some example embodiments, the transport protocol includes a Transmission Control Protocol (TCP), a Stream Control Transmission Protocol (SCTP), a QUIC protocol, or a Transport Layer Security (TLS) protocol. In at least some example embodiments, the label distribution protocol includes a Label Distribution Protocol (LDP).

In at least some example embodiments, a method includes supporting, by a first label switched router based on negotiation with a second label switched router, selection of a transport protocol to be used between the first label switched router and the second label switched router to support a label distribution protocol between the first label switched router and the second label switched route and supporting, by the first label switched router using the transport protocol, use of the label distribution protocol between the first label switched router and the second label switched router. In at least some example embodiments, supporting selection of the transport protocol includes supporting, by the first label switched router, communication of an indication of a set of transport protocols available for supporting the label distribution protocol between the first label switched router and the second label switched router. In at least some example embodiments, the indication of the set of transport protocols includes a list of the transport protocols available for supporting the label distribution protocol between the first label switched router and the second label switched router. In at least some example embodiments, the list of transport protocols available for supporting the label distribution protocol between the first label switched router and the second label switched router is configured to indicate a prioritized ordering of the transport protocols available for supporting the label distribution protocol between the first label switched router and the second label switched router. In at least some example embodiments, the indication of the set of transport protocols is included within a type-length-value (TLV) including a set of transport element fields encoding respective indications of the respective transport protocols available for supporting the label distribution protocol between the first label switched router. In at least some example embodiments, the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router. In at least some example embodiments, the indication of the set of transport protocols is included within a type-length-value (TLV) including a field that includes the bit string. In at least some example embodiments, the indication of the set of transport protocols is communicated within an adjacency message of the label distribution protocol. In at least some example embodiments, supporting communication of the indication of the set of transport protocols available for supporting the label distribution protocol between the first label switched router and the second label switched router includes sending, by the first label switched router toward the second label switched router, an indication of a set of transport protocols available at the first label switched router for supporting the label distribution protocol between the first label switched router and the second label switched router. In at least some example embodiments, supporting communication of the indication of the set of transport protocols available for supporting the label distribution protocol between the first label switched router and the second label switched router includes receiving, by the first label switched router from the second label switched router, an indication of a set of transport protocols available at the second label switched router for supporting the label distribution protocol between the first label switched router and the second label switched router. In at least some example embodiments, supporting selection of the transport protocol includes selecting, by the first label switched router based on a set of transport protocols supported by the first label switched router and a set of transport protocols supported by the second label switched router, the transport protocol to be used between the first label switched router and the second label switched router to support the label distribution protocol between the first label switched router and the second label switched router. In at least some example embodiments, the transport protocol to be used between the first label switched router and the second label switched router is selected, from a set of common transport protocols supported by the first label switched router and the second label switched router, as a highest priority transport protocol indicated by one of the first label switched router or the second label switched router having a lower label distribution protocol identifier. In at least some example embodiments, selecting the transport protocol includes determining, by the first label switched router based on the set of transport protocols supported by the first label switched router and the set of transport protocols supported by the second label switched router, a set of common transport protocols supported by the first label switched router and the second label switched router and determining, by the first label switched router based on the set of common transport protocols supported by the first label switched router and the second label switched router, the transport protocol to be used between the first label switched router and the second label switched router to support the label distribution protocol between the first label switched router and the second label switched router. In at least some example embodiments, determining the transport protocol includes determining, by the first label switched router based on a first router identifier of the first label switched router and a second router identifier of the second label switched router, a label switched router having a lower label distribution protocol identifier and determining, from the set of common transport protocols supported by the first label switched router and the second label switched router, a highest priority transport protocol of the label switched router having the lower label distribution protocol identifier. In at least some example embodiments, supporting use of the label distribution protocol between the first label switched router and the second label switched router includes supporting, by the first label switched router using the transport protocol, establishment of a transport connection between the first label switched router and the second label switched router. In at least some example embodiments, supporting establishment of the transport connection between the first label switched router and the second label switched router includes negotiating, by the first label switched router during the establishment of the transport connection, that application data to be transported on the transport connection includes label distribution protocol data of the label distribution protocol. In at least some example embodiments, negotiating that the application data to be transported on the transport connection includes label distribution protocol data of the label distribution protocol includes supporting use of a transport protocol port number that is assigned for the transport protocol to indicate use of the label distribution protocol. In at least some example embodiments, supporting use of the label distribution protocol between the first label switched router and the second label switched router includes supporting, by the first label switched router using a transport connection of the transport protocol and based on the label distribution protocol, establishment of a label distribution protocol session between the first label switched router and the second label switched router. In at least some example embodiments, supporting establishment of the label distribution protocol session between the first label switched router and the second label switched router includes supporting, by the first label switched router using the transport connection and based on the label distribution protocol, communication of a label distribution session establishment message of the label distribution protocol. In at least some example embodiments, supporting use of the label distribution protocol between the first label switched router and the second label switched router includes supporting, by the first label switched router using a transport connection of the transport protocol and based on a label distribution protocol session established between the first label switched router and the second label switched router based on the label distribution protocol, communication of a label distribution session message of the label distribution protocol between the first label switched router and the second label switched router. In at least some example embodiments, supporting use of the label distribution protocol between the first label switched router and the second label switched router includes supporting, by the first label switched router on a transport connection of the transport protocol, a set of streams of the transport connection, the set of streams of the transport connection configured to transport a respective set of label distribution protocol sessions of the label distribution protocol. In at least some example embodiments, the label distribution protocol sessions of the label distribution protocol are associated with respective feature sets to be supported between the first label switched router and the second label switched router. In at least some example embodiments, the feature sets to be supported between the first label switched router and the second label switched router are associated with respective Forwarding Equivalence Classes (FECs). In at least some example embodiments, supporting use of the label distribution protocol between the first label switched router and the second label switched router includes supporting, by the first label switched router on a transport connection of the transport protocol, a first stream configured to transport a first label distribution protocol session associated with a first set of features to be supported between the first label switched router and the second label switched router and supporting, by the first label switched router on the transport connection, a second stream configured to transport a second label distribution protocol session associated with a second set of features to be supported between the first label switched router and the second label switched router. In at least some example embodiments, the transport protocol includes a Transmission Control Protocol (TCP), a Stream Control Transmission Protocol (SCTP), a QUIC protocol, or a Transport Layer Security (TLS) protocol. In at least some example embodiments, the label distribution protocol includes a Label Distribution Protocol (LDP).

In at least some example embodiments, an apparatus includes means for supporting, by a first label switched router based on negotiation with a second label switched router, selection of a transport protocol to be used between the first label switched router and the second label switched router to support a label distribution protocol between the first label switched router and the second label switched route and means for supporting, by the first label switched router using the transport protocol, use of the label distribution protocol between the first label switched router and the second label switched router. In at least some example embodiments, the means for supporting selection of the transport protocol includes means for supporting, by the first label switched router, communication of an indication of a set of transport protocols available for supporting the label distribution protocol between the first label switched router and the second label switched router. In at least some example embodiments, the indication of the set of transport protocols includes a list of the transport protocols available for supporting the label distribution protocol between the first label switched router and the second label switched router. In at least some example embodiments, the list of transport protocols available for supporting the label distribution protocol between the first label switched router and the second label switched router is configured to indicate a prioritized ordering of the transport protocols available for supporting the label distribution protocol between the first label switched router and the second label switched router. In at least some example embodiments, the indication of the set of transport protocols is included within a type-length-value (TLV) including a set of transport element fields encoding respective indications of the respective transport protocols available for supporting the label distribution protocol between the first label switched router. In at least some example embodiments, the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router. In at least some example embodiments, the indication of the set of transport protocols is included within a type-length-value (TLV) including a field that includes the bit string. In at least some example embodiments, the indication of the set of transport protocols is communicated within an adjacency message of the label distribution protocol. In at least some example embodiments, the means for supporting communication of the indication of the set of transport protocols available for supporting the label distribution protocol between the first label switched router and the second label switched router includes means for sending, by the first label switched router toward the second label switched router, an indication of a set of transport protocols available at the first label switched router for supporting the label distribution protocol between the first label switched router and the second label switched router. In at least some example embodiments, the means for supporting communication of the indication of the set of transport protocols available for supporting the label distribution protocol between the first label switched router and the second label switched router includes means for receiving, by the first label switched router from the second label switched router, an indication of a set of transport protocols available at the second label switched router for supporting the label distribution protocol between the first label switched router and the second label switched router. In at least some example embodiments, the means for supporting selection of the transport protocol includes means for selecting, by the first label switched router based on a set of transport protocols supported by the first label switched router and a set of transport protocols supported by the second label switched router, the transport protocol to be used between the first label switched router and the second label switched router to support the label distribution protocol between the first label switched router and the second label switched router. In at least some example embodiments, the transport protocol to be used between the first label switched router and the second label switched router is selected, from a set of common transport protocols supported by the first label switched router and the second label switched router, as a highest priority transport protocol indicated by one of the first label switched router or the second label switched router having a lower label distribution protocol identifier. In at least some example embodiments, the means for selecting the transport protocol includes means for determining, by the first label switched router based on the set of transport protocols supported by the first label switched router and the set of transport protocols supported by the second label switched router, a set of common transport protocols supported by the first label switched router and the second label switched router and means for determining, by the first label switched router based on the set of common transport protocols supported by the first label switched router and the second label switched router, the transport protocol to be used between the first label switched router and the second label switched router to support the label distribution protocol between the first label switched router and the second label switched router. In at least some example embodiments, the means for determining the transport protocol includes means for determining, by the first label switched router based on a first router identifier of the first label switched router and a second router identifier of the second label switched router, a label switched router having a lower label distribution protocol identifier and means for determining, from the set of common transport protocols supported by the first label switched router and the second label switched router, a highest priority transport protocol of the label switched router having the lower label distribution protocol identifier. In at least some example embodiments, the means for supporting use of the label distribution protocol between the first label switched router and the second label switched router includes means for supporting, by the first label switched router using the transport protocol, establishment of a transport connection between the first label switched router and the second label switched router. In at least some example embodiments, the means for supporting establishment of the transport connection between the first label switched router and the second label switched router includes means for negotiating, by the first label switched router during the establishment of the transport connection, that application data to be transported on the transport connection includes label distribution protocol data of the label distribution protocol. In at least some example embodiments, the means for negotiating that the application data to be transported on the transport connection includes label distribution protocol data of the label distribution protocol includes means for supporting use of a transport protocol port number that is assigned for the transport protocol to indicate use of the label distribution protocol. In at least some example embodiments, the means for supporting use of the label distribution protocol between the first label switched router and the second label switched router includes means for supporting, by the first label switched router using a transport connection of the transport protocol and based on the label distribution protocol, establishment of a label distribution protocol session between the first label switched router and the second label switched router. In at least some example embodiments, the means for supporting establishment of the label distribution protocol session between the first label switched router and the second label switched router includes means for supporting, by the first label switched router using the transport connection and based on the label distribution protocol, communication of a label distribution session establishment message of the label distribution protocol. In at least some example embodiments, the means for supporting use of the label distribution protocol between the first label switched router and the second label switched router includes means for supporting, by the first label switched router using a transport connection of the transport protocol and based on a label distribution protocol session established between the first label switched router and the second label switched router based on the label distribution protocol, communication of a label distribution session message of the label distribution protocol between the first label switched router and the second label switched router. In at least some example embodiments, the means for supporting use of the label distribution protocol between the first label switched router and the second label switched router includes means for supporting, by the first label switched router on a transport connection of the transport protocol, a set of streams of the transport connection, the set of streams of the transport connection configured to transport a respective set of label distribution protocol sessions of the label distribution protocol. In at least some example embodiments, the label distribution protocol sessions of the label distribution protocol are associated with respective feature sets to be supported between the first label switched router and the second label switched router. In at least some example embodiments, the feature sets to be supported between the first label switched router and the second label switched router are associated with respective Forwarding Equivalence Classes (FECs). In at least some example embodiments, the means for supporting use of the label distribution protocol between the first label switched router and the second label switched router includes means for supporting, by the first label switched router on a transport connection of the transport protocol, a first stream configured to transport a first label distribution protocol session associated with a first set of features to be supported between the first label switched router and the second label switched router and means for supporting, by the first label switched router on the transport connection, a second stream configured to transport a second label distribution protocol session associated with a second set of features to be supported between the first label switched router and the second label switched router. In at least some example embodiments, the transport protocol includes a Transmission Control Protocol (TCP), a Stream Control Transmission Protocol (SCTP), a QUIC protocol, or a Transport Layer Security (TLS) protocol. In at least some example embodiments, the label distribution protocol includes a Label Distribution Protocol (LDP).

BRIEF DESCRIPTION OF THE DRAWINGS

The teachings herein can be readily understood by considering the following detailed description in conjunction with the accompanying drawings, in which:

FIG. 2 depicts an example embodiment of a Transport Preferences TLV configured to encode a set of transport protocols which may be used to support an LDP session;

FIG. 3 depicts an example embodiment of a generic transport element configured to encode a transport protocol in the set of transport protocols in the Transport Preferences TLV of FIG. 2;

FIG. 4 depicts an example embodiment of a Transport Preferences TLV configured to encode a set of transport protocols which may be used to support an LDP session;

FIG. 7 depicts example embodiments of protocol negotiation extensions in a transport protocol which may be used by label switched routers to negotiate payload protocol type support during connection setup;

FIG. 8 depicts an example embodiment of a method for use by a communication device to support use of a selected transport protocol to support a label distribution protocol in a label switching network.

To facilitate understanding, identical reference numerals have been used herein, wherever possible, in order to designate identical elements that are common among the various figures.

DETAILED DESCRIPTION

Figure 1:
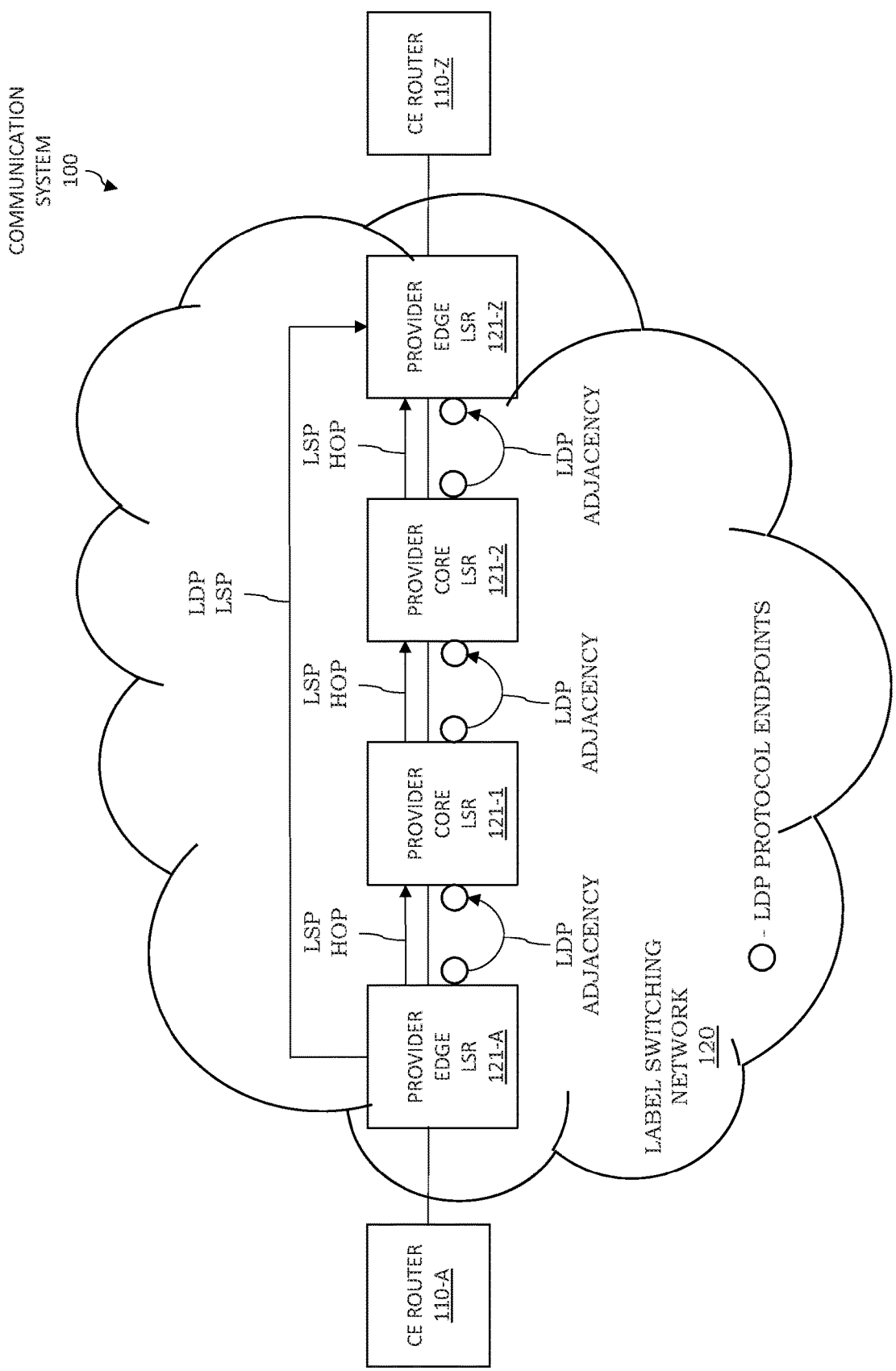
FIG. 1 depicts an example embodiment of a communication system configured to support selection of a transport protocol for use in supporting a label distribution protocol in a label switching network.

Various example embodiments for supporting selection of a transport protocol for use in supporting a label distribution protocol in a label switching network are presented. Various example embodiments for supporting selection of a transport protocol for use in supporting a label distribution protocol in a label switching network may be configured to support multiple transport protocol options for use in supporting use of the label distribution protocol between a pair of label switched routers in the label switching network. Various example embodiments for supporting selection of a transport protocol for use in supporting a label distribution protocol in a label switching network may be configured to use the selected transport protocol to support various aspects of the label distribution protocol (e.g., establishment of a transport connection of the transport protocol where the transport connection may be used to support a label distribution protocol session of the label distribution protocol, establishment of a label distribution protocol session based on the label distribution protocol, label distribution based on the label distribution protocol, and so forth). Various example embodiments for supporting selection of a transport protocol for use in supporting a label distribution protocol in a label switching network may be configured to support, by a first label switched router based on negotiation with a second label switched router, selection of a transport protocol to be used between the first label switched router and the second label switched router to support a label distribution protocol between the first label switched router and the second label switched router and support, by the first label switched router using the transport protocol, use of the label distribution protocol between the first label switched router and the second label switched router. Various example embodiments for supporting selection of a transport protocol for use in supporting a label distribution protocol in a label switching network may be configured to support selection of a transport protocol operating at the transport layer (e.g., Transmission Control Protocol (TCP), Stream Control Transmission Protocol (SCTP), QUIC, or the like) or session layer (e.g., Transport Layer Security (TLS) or the like) of the Open Systems Interconnection (OSI) model. Various example embodiments for supporting selection of a transport protocol for use in supporting a label distribution protocol in a label switching network may be configured to support use of the selected transport protocol to support various label distribution protocols (e.g., Label Distribution Protocol (LDP) or the like). It will be appreciated that, although primarily presented herein with respect to embodiments in which the transport protocol operates at the transport layer in the OSI model, TLS may be a transport protocol from the perspective of LDP and, thus, the transport protocol and associated transport connection also may be based on protocols typically categorized as operating at the session layer in the OSI model. It will be appreciated that these and various other example embodiments and advantages or potential advantages of supporting selection of a transport protocol for use in supporting a label distribution protocol in a label switching network may be further understood by way of reference to the various figures, which are discussed further below.

FIG. 1 depicts an example embodiment of a communication system configured to support selection of a transport protocol for use in supporting a label distribution protocol in a label switching network.

The communication system 100 includes a pair of customer edge routers 110-A and 110-Z (collectively, customer edge routers 110) connected via a label switching network 120.

The label switching network 120 includes a set of label switched routers (LSRs) 121. The set of LSRs 121 includes a pair of provider edge LSRs including a provider edge LSR 121-A (which is communicatively connected to customer edge router 110-A and configured to support communications of the customer edge router 110-A) and a provider edge LSR 121-Z (which is communicatively connected to customer edge router 110-Z and configured to support communications of the customer edge router 110-Z). The set of LSRs 121 also includes a pair of provider core LSRs including a provider core LSR 121-1 (which is communicatively connected to provider edge LSR 121-A) and a provider core LSR 121-2 (which is communicatively connected to provider edge LSR 121-Z). The provider core LSRs 121-1 and 121-2 are communicatively connected.

The label switching network 120 is configured to support use of Multiprotocol Label Switching (MPLS) for supporting communication between the LSRs 121 of the label switching network 120 based on label switched paths (LSPs). The label switching network 120 is configured to support use of a Label Distribution Protocol (LDP) for supporting establishment of the LSPs for supporting communication between the LSRs 121 of the label switching network 120. In the label switching network 120, a pair of LSRs 121 may form an LDP peering in order to exchange label mappings for Forwarding Equivalence Classes (FECs). In general, a FEC is an identifier of an LSP which represents a class of traffic that receives the same MPLS forwarding treatment. An LSR 121, based on the label mappings exchanged based on the LDP peering, sets up its forwarding state of LSPs. The end-to-end path of an LSP gets constructed across a chain of neighboring LSRs. In the label switching network 120, as indicated above, a pair of LSRs 121 may form an LDP peering in order to exchange label mappings. The establishment of an LDP peering between a pair of LSRs is generally a three-step process as discussed further below.

The label switching network 120 is configured to support multiple transport protocol options for use in supporting use of LDP between pairs of LSRs 121 in the label switching network 120. The LSRs 121 may be configured to send transport protocol preferences to peer LSRs 121. The LSRs 121 may send transport protocol preferences to peer LSRs 121 based on inclusion of an additional transport preferences parameter in LDP Hello Messages (e.g., a list of transport protocols in the order of preference of the LSR 121 sending the transport preference parameter, such as where the transport preferences parameter is {QUIC, SCTP, TLS, TCP}, thereby indicating that QUIC is the first preference of the LSR 121, SCTP is the second preference of the LSR 121, TLS the third preference of the LSR 121, and TCP is the fourth and final preference of the LSR 121). The LSRs 121 may be configured to receive and process transport protocol preferences from peer LSRs 121. The LSRs 121 may be configured to select, based on analysis of the transport protocol preferences, a transport protocol for use in supporting use of LDP (e.g., selecting, from a common set of transport protocol preferences requested by both of the LSRs 121 in the pair of LSRs 121, the transport protocol that is most preferred by one of the LSRs 121 in the pair of LSRs 121 (e.g., the LSR 121 having the lower LDP-ID)). The LSRs 121, after selection of the transport protocol for use in supporting LDP, may be configured to use the transport protocol to support use of LDP between the LSRs 121. The LSRs 121 may be configured to use the transport protocol to establish a transport connection between the LSRs 121, where the transport connection between the LSRs 121 may be used to support an LDP session between the LSRs 121. The LSRs 121 may be configured to use the transport connection between the LSRs 121 to support establishment of an LDP session between the LSRs 121. The LSRs may be configured to use the LDP session between the LSRs 121 (and, thus, the transport connection between the LSRs 121) to support label distributions based on LDP. The LSRs 121, after selection of the transport protocol for use in supporting LDP, may be configured to use the transport protocol to support use of LDP between the LSRs for supporting various other functions. The LSRs may be configured to support various other functions for supporting selection of transport protocols for supporting LDP and for supporting use of the selected transport protocols for supporting LDP.

The label switching network 120 is configured to support establishment of an LDP peering between a pair of LSRs 121 and, thus, use of LDP between the pair of LSRs 121, based on a transport protocol selected by the LSRs 121 for supporting the LDP peering. The establishment of an LDP peering between a pair of LSRs 121 is generally a three-step process as discussed further below.

In the establishment of an LDP peering between a pair of LSRs configured to support selection of a transport protocol to support the LDP peering, the first step may be establishment of an adjacency between the LSRs. The LDP at an LSR periodically broadcasts Hello messages on the links on which LDP is enabled. The Hello messages may be transmitted as User Datagram Protocol (UDP) packets with UDP destination port number 646. The UDP packets are further transported as IP packets with a link broadcast scope destination IP address. When a first LSR receives Hello messages on a link from a second LSR, and the parameters negotiated based on the Hello messages are agreed upon, then the first LSR forms an LDP "adjacency" with the second LSR. It is noted that this will be understood to be a link-level LDP adjacency. It will be appreciated that, although primarily described with respect to formation of link-level LDP adjacencies, LSRs also may exchange Hello messages with remote LSRs across multiple routing hops, targeted to the IP addresses of the LSRs, to form LDP "targeted adjacencies" between indirectly connected LSRs. It will be appreciated that, since various example embodiments presented herein are applicable to both link-level LDP adjacencies and LDP targeted adjacencies, references herein to "adjacencies" may refer to either type of adjacency. The parameters that are negotiated include the transport protocol to be used to support the LDP peering (e.g., TCP, SCTP, QUIC, TLS, or the like).

In the establishment of an LDP peering between a pair of LSRs configured to support selection of a transport protocol to support the LDP peering, the second step may be establishment of a transport connection between the LSRs based on the negotiated transport protocol. Typically, the LSR having the lower LSR identifier (e.g., LDP Identifier (LDP-ID) will initiate the transport connection. It will be appreciated that the manner in which the transport connection is establish may depend on the transport protocol agreed to by the LSRs of the LDP peering. The transport protocol is configured to indicate LDP as the user application of the transport connection.

In the establishment of an LDP peering between a pair of LSRs configured to support selection of a transport protocol to support the LDP peering, the third step may be establishment of an LDP session between the LSRs. Once the transport connection is established, the pair of LSRs exchanges LDP initialization messages (e.g., LDP Handshake messages) over the transport connection to establish the LDP session therebetween. Once the LDP session is established, the LSRs can exchange any LDP messages, including label mapping messages, over the LDP session. It is noted that, if the transport protocol that is used supports multi-streaming (e.g., QUIC. SCTP, and so forth, then each LSR independently may map a FEC type or set of features to an independent stream in the transport connection, such that multiple streams of the transport connection may support multiple different FEC types or feature set, respectively, thereby eliminating the head-of-the-line (HOL) blocking between FEC types or competing features.

It will be appreciated that, although communication system 100 is primarily presented with respect to specific types, numbers, and arrangements of elements, communication system 100 may use various other types, numbers, and arrangements of elements.

The LSRs in a label switching network, as described hereinabove with respect to FIG. 1, may be configured to support various functions for supporting selection of transport protocols for supporting LDP and for supporting use of the selected transport protocols for supporting LDP. It will be appreciated that various aspects of supporting selection of transport protocols for supporting LDP and for supporting use of the selected transport protocols for supporting LDP are described further below.

The LSRs may be configured to communicate transport protocol preferences to peer LSRs. The LSRs may communicate transport protocol preferences to peer LSRs using messages of the label distribution protocol (e.g., adjacency messages, such as LDP Hello messages, or other suitable types of messages. The LSRs may communicate transport protocol preferences by encoding indications of the transport protocol preferences in messages sent to peer LSRs. The LSRs may encode indications of the transport protocol preferences in messages sent to peer LSRs in a number of ways (e.g., as a prioritized list of transport protocols using fields to encode indications of the preferred transport protocols, as a bit string where bit positions of the bit string represent transport protocols and the bit positions may be set in a manner encoding indications of the preferred transport protocols, or the like, as well as various combinations thereof), at least some of which are discussed further below.

In at least some example embodiments, the transport protocol preferences may be communicated using a Transport Preferences TLV configured to encode the preferred transport protocols using fields to encode indications of the preferred transport protocols. An example of such a Transport Preferences TLV is depicted in FIG. 2 as Transport Preferences TLV 200.

The Transport Preferences TLV 200 can be included in LDP Hello Messages as optional parameters. The Transport Preferences TLV 200 encodes the list of transport protocols supported by the LSR in the order of preference. The Transport Preferences TLV 200, as depicted in FIG. 2, includes the following fields: a U-bit field, an F-bit field, a Type field, a Length field, a set of one or more Transport Element fields.

The U-bit field is a one-bit field. If the U-bit field is set to one ("1"), this means that, if an LSR receiving this Transport Preferences TLV does not support this TLV (e.g., the LSR implements legacy LDP without support for transport protocol negotiation), then the receiving LSR should silently ignore this Transport Preferences TLV.

The F-bit field is a one-bit field. If the F-bit field is set to zero ("0"), this indicates that the Transport Preferences TLV must not be forwarded further by a receiving LSR, if it does not support the Transport Preferences TLV.

The Type field is a 14-bit field. The Type field, is set to the type value assigned for the Transport Preferences TLV. For example, the value 0x0976, which is currently available in LDP TLV registry in IANA, may be used as the type value for Transport Preferences TLV. It will be appreciated that any other available value may be used as the type value that indicates that the TLV is a Transport Preferences TLV (e.g., any other value which may be reserved in the LDP TLV registry in IANA for this purpose).

The Length field is a 16-bit field. The Length field includes a value that encodes the total length of the set of Transport Element fields (illustratively, Transport Elements 1 to n).

The set of Transport Element fields (illustrated as Transport Element 1 to Transport Element n) encodes a prioritized list of transport protocols. The first Transport Element (Transport Element 1) may encode the most preferred transport protocol and the last Transport Element (Transport Element n) may encode the least preferred transport protocol There can be several types of Transport Elements, each type carrying information about a specific transport protocol type. The encoding of the Transport Element field depends on the type. A Transport Element field is encoded as a 1-octet field that specifies the element type, and a variable length field that is the Protocol Type element value. It is noted that, while the representation of the Transport Element value is type-dependent, a standard LDP TLV encoding is not used. A Generic Transport Element is depicted in FIG. 3 as Generic Transport Element 300.

The Generic Transport Element 300 may be used to encode an indication of a transport protocol within a Transport Element field of the Transport Preferences TLV 200. The Type portion of the Generic Transport Element 300 is configured to indicate that the Generic Transport Element 300 includes a value indicative of a transport protocol. For example, a value of 0x01 (or any other suitable value) may be used within the Type portion of the Generic Transport Element 300 in order to indicate that the Generic Transport Element 300 includes a value indicative of a transport protocol. The Value portion of the Generic Transport Element 300 includes a 1-octet Protocol Type field which indicates the transport protocol. For example, the following values may be assigned to represent transport protocols: 1=TCP, 2=SCTP, 3=QUIC, 4=TLS. It will be appreciated that the values may be assigned to transport protocols in other ways. It will be appreciated that other transport protocols may be assigned other values (e.g., given an 8-bit field for representing values of the transport protocols, 256 values may be assigned in various ways to represent 256 different transport protocols). It will be appreciated that the indications of the transport protocols requested by an LSR may be encoded within the Transport Protocol Preferences TLV 200 in various other ways.

It will be appreciated that the selection of IP addresses to be used for establishing the transport connection of a protocol type encoded in the Generic Transport Element may be performed based on the LDP specification. For example, the selection of IP addresses to be used for establishing the transport connection of a protocol type encoded in the Generic Transport Element may be performed based on Section 3.5.2 of the LDP specification, which describes the following two TLVs as optional parameters in an LDP Hello Message: IPv4 Transport Address TLV and IPv6 Transport Address TLV.

The IPv4 Transport Address TLV specifies the IPv4 address to be used for the sending LSR when opening the LDP session TCP connection. If this optional TLV is not present, the IPv4 source address for the UDP packet carrying the Hello Message is used.

The IPv6 Transport Address TLV specifies the IPv6 address to be used for the sending LSR when opening the LDP session TCP connection. If this optional TLV is not present, the IPv6 source address for the UDP packet carrying the Hello Message is used.

The same rules as described above are applicable to a Generic Transport Element. If IPv4/IPv6 Transport Address TLV is present, then its specified IPv4/IPv6 address to be used for the sending LSR when opening the connection for the Protocol Type in Generic Transport Element. If IPv4/IPv6 Transport Address TLV is not present, then IPv4/IPv6 source address for the UDP packet carrying the Hello may be used for the Protocol Type in Generic Transport Element.

In at least some example embodiments, the transport protocol preferences may be communicated using a Transport Preferences TLV configured to encode the preferred transport protocols using as a bit string where bit positions of the bit string represent transport protocols and the bit positions may be set in a manner encoding indications of the preferred transport protocols. An example of such a Transport Preferences TLV is depicted in FIG. 4 as Transport Preferences TLV 400.

The Transport Preferences TLV 400 can be included in LDP Hello Messages as optional parameters. The Transport Preferences TLV 400 encodes the list of transport protocols supported by the LSR using bit positions in a bit string. The Transport Preferences TLV 400, as depicted in FIG. 4, includes the following fields: a U-bit field, an F-bit field, a Type field, a Length field, and a Transport Bit String field.

The U-bit field is a one-bit field. If the U-bit field is set to one ("1"), this means that, if an LSR receiving this Transport Preferences TLV does not support this TLV (e.g., the LSR implements legacy LDP without support for transport protocol negotiation), then the receiving LSR should silently ignore this Transport Preferences TLV.

The F-bit field is a one-bit field. If the F-bit field is set to zero ("0"), this indicates that the Transport Preferences TLV must not be forwarded further by a receiving LSR, if it does not support the Transport Preferences TLV.

The Type field is a 14-bit field. The Type field, is set to the type value assigned for the Transport Preferences TLV. For example, the value 0x0976, which is currently available in LDP TLV registry in IANA, may be used as the type value for Transport Preferences TLV. It will be appreciated that any other available value may be used as the type value that indicates that the TLV is a Transport Preferences TLV (e.g., any other value which may be reserved in the LDP TLV registry in IANA for this purpose).

The Transport Bit string field is a 4-octet field having 32 bit positions, one or more of which are assigned to specific transport protocols. The transport protocols may be assigned to the bit positions in various ways. In one example, the assignment of transport protocols to bit positions may include assignment of TCP to bit position 1, assignment of SCTP to bit position 2, assignment of TLS to bit position 3, and assignment of QUIC to bit position 4. It will be appreciated that the transport protocols may be assigned to bit positions in other ways, that other transport protocols may be assigned to bit positions (e.g., given an 32-bit field for bit string, 32 different transport protocols may be supported), or the like, as well as various combinations thereof. The setting of a bit of a bit position indicates that the LSR supports use of the transport protocol for supporting an LDP session. Here, the preferences may or may not be implicit in the bit position assigned to the transport protocol (e.g., a higher bit position is a higher preference and a lower bit position is a lower reference).

It will be appreciated that, while use of a bit string to communicate the supported transport protocols is simple and compact, it also has certain limitations. For example, use of the bit string to communicate the supported transport protocols may be considered to be relatively simple and compact since a receiving LSR simply has to perform a bit wise AND operation between the received Transport Bit String and the Transport Bit String included in the Hellos sent out by the LSR, and then choose the highest common bit position as the transport protocol for the LDP session. For example, use of the bit string to communicate the supported transport protocols may be considered to be a limited solution since LSRs do not have any flexibility to alter the relative importance of any given transport protocol since the assignments of the transport protocols to the bit positions are fixed, LSRs are unable to communicate protocol specific parameters for the transport protocols, and so forth.

The LSRs may be configured to send transport protocol preferences to peer LSRs. The LSRs may send transport protocol preferences to peer LSRs by including Transport Preferences TLVs in LDP Hello messages sent by the LSRs to the peer LSRs. An example embodiment of a method for use by an LSR to include a Transport Preferences TLV in an LDP Hello Message sent by the LSR, for communicating transport protocol preferences to a peer LSR, is presented in FIG. 5.

Figure 5:
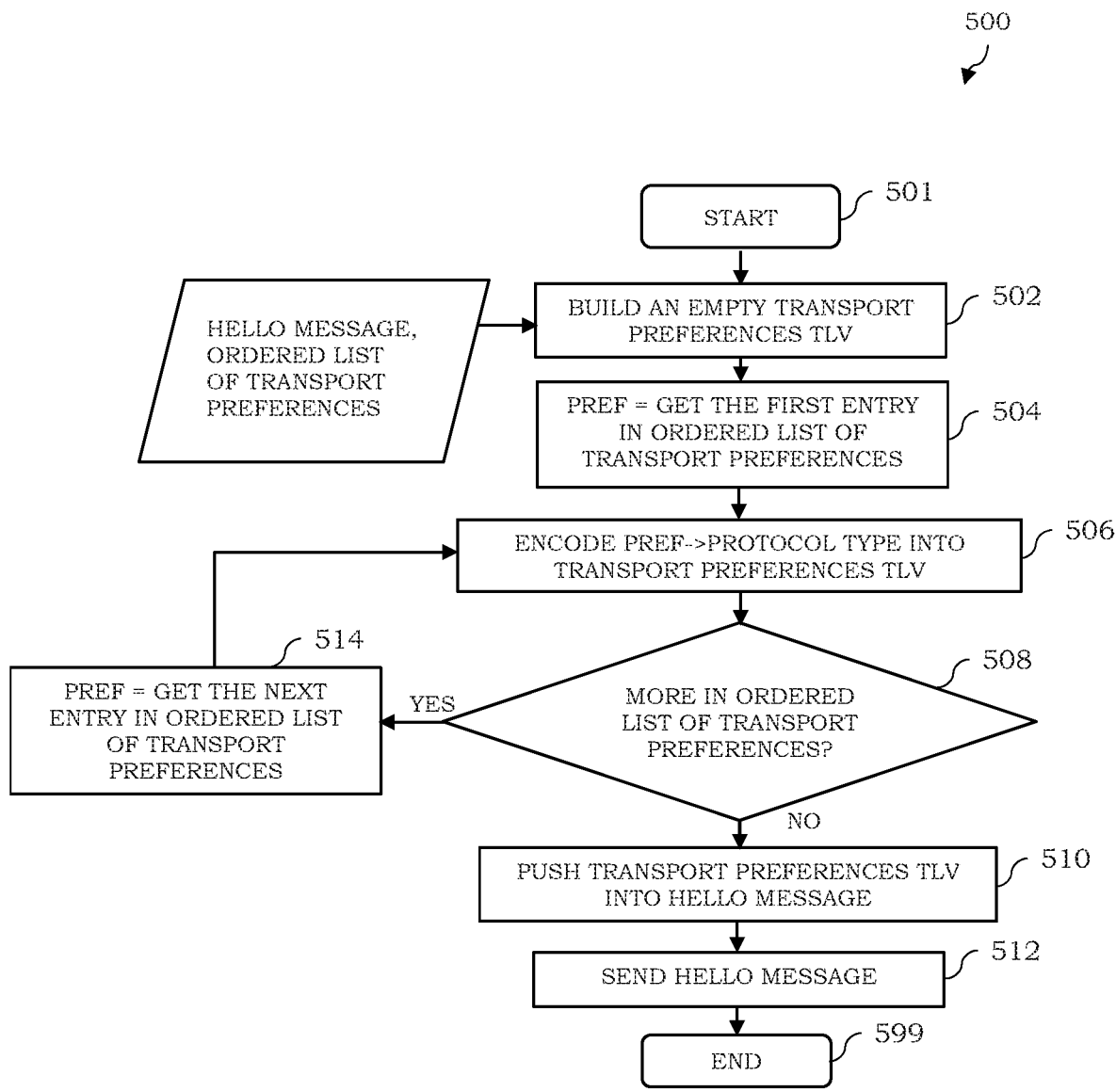
FIG. 5 depicts an example embodiment of a method for use by a label switched router for sending a Transport Preferences TLV in an LDP Hello Message.

FIG. 5 depicts an example embodiment of a method for use by a label switched router for sending a Transport Preferences TLV in an LDP Hello Message. It will be appreciated that, although primarily presented as being performed serially, at least a portion of the functions of method 500 may be performed contemporaneously or in a different order than as presented with respect to FIG. 5. The inputs to the method 500 are a Hello Message and an ordered list of transport preferences. It is assumed that the Hello Message is already encoded with other TLVs/parameters based on the LDP specification. The method 500 begins at block 501 and proceeds to block 502. Block 502 builds an empty Transport Preferences TLV, and the method 500 then proceeds to block 504. Block 504 retrieves the first entry in the ordered list of transport preferences, and the method 500 then proceeds to block 506. Block 506 encodes the protocol type into the value of the Transport Preferences TLV (e.g., Transport Preferences TLV 200 of FIG. 2, Transport Preferences TLV 400 of FIG. 4, or the like), and the method 500 then proceeds to block 508. Block 508 checks if there are more entries in the ordered list of transport preferences. If the ordered list of transport preferences has more entries, then the method 500 proceeds to block 514, otherwise the method 500 proceeds to block 510. Block 514 retrieves the next entry in the ordered list of transport preferences, and the method then returns to block 506 to repeat subsequent steps to encode the next entry into the value of Transport Preferences TLV. Block 510 pushes the Transport Preferences TLV onto the Hello Message, and the method 500 proceeds to block 512. Block 512 sends the Hello Message over the appropriate link or to a targeted peer LSR. At block 599, the method 500 ends.

The LSRs may be configured to receive and process transport protocol preferences from peer LSRs. The LSRs may receive transport protocol preferences from peer LSRs in Transport Preferences TLVs in LDP Hello messages sent by the peer LSRs to the LSRs. An example embodiment of a method for use by an LSR to receive and process a Transport Preferences TLV in an LDP Hello Message sent by a peer LSR, for communicating transport protocol preferences to a LSR, is presented in FIG. 6.

Figure 6:
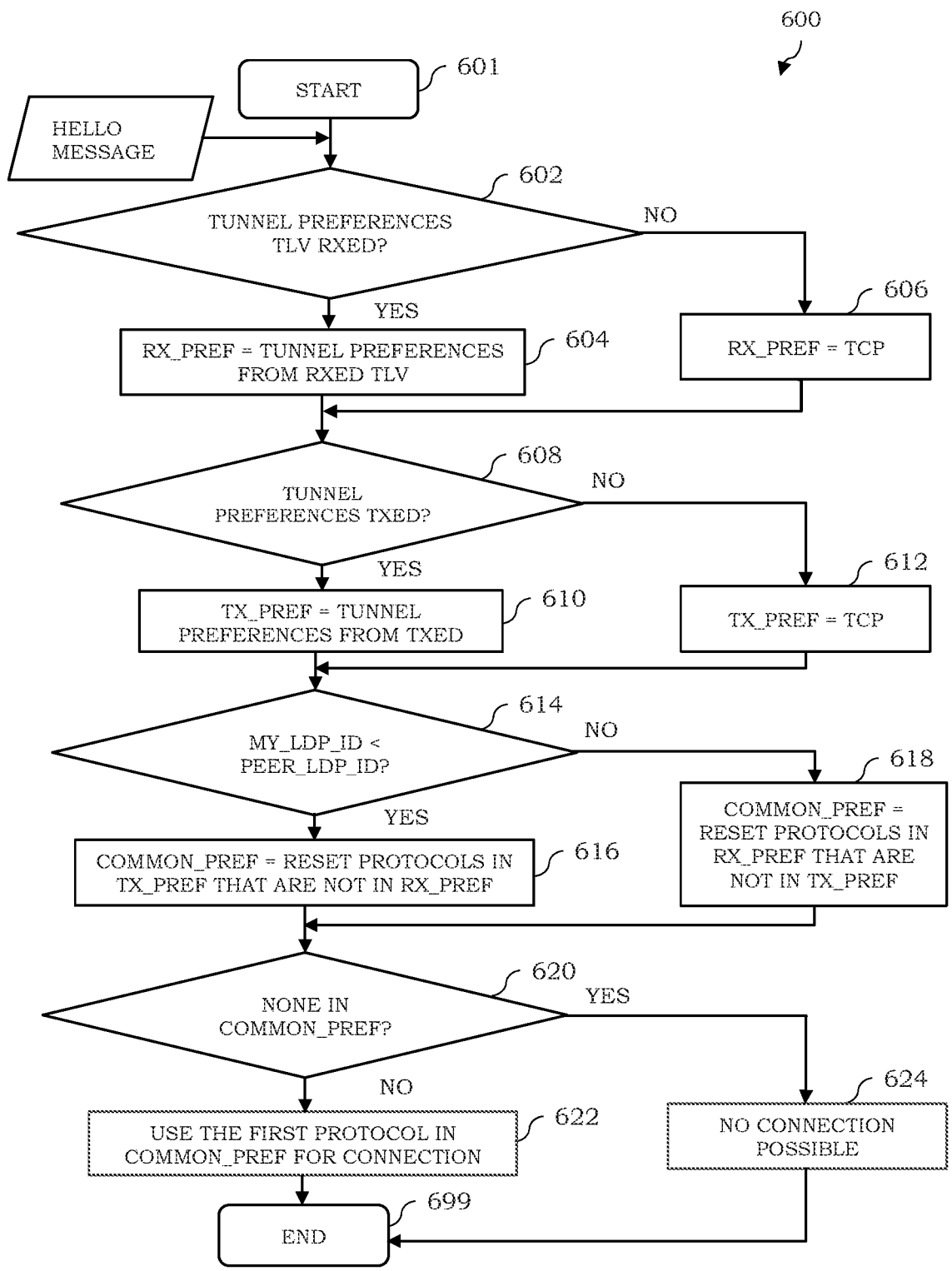
FIG. 6 depicts an example embodiment of a method for use by a label switched router for receiving and processing a Transport Preferences TLV in an LDP Hello Message.

FIG. 6 depicts an example embodiment of a method for use by a label switched router for receiving and processing a Transport Preferences TLV in an LDP Hello Message. It will be appreciated that, although primarily presented as being performed serially, at least a portion of the functions of method 600 may be performed contemporaneously or in a different order than as presented with respect to FIG. 6. It will be appreciated that the method 600 is based on the Transport Preferences TLV 200 of FIG. 2. The input to the method 600 is a Hello Message received from a peering LSR. The method 600 begins at block 601 and proceeds to block 602. Block 602 checks if the Transport Preferences TLV is included in the received Hello Message. If the Transport Preferences TLV is included in the received Hello Message, then the method 600 proceeds to block 604, otherwise the method 600 proceeds to block 606. Block 604 extracts the received ordered list of transport preferences from the received Transport Preferences TLV and proceeds to block 608. Block 606 sets the received ordered list of transport preferences with TCP only, since no Transport Preferences TLV was received, and proceeds to block 608. Block 608 checks if the Tunnel Preferences TLV is included in the Hello Messages sent by the LSR. If the Tunnel Preferences TLV is included in the Hello Messages sent by the LSR, then the method 600 proceeds to block 610, otherwise the method 600 proceeds to block 612. Block 610 extracts the sent ordered list of transport preferences from the sent Tunnel Preferences TLV, and the method 600 then proceeds to block 614. Block 612 sets the sent ordered list of transport preferences with TCP only, since no Tunnel Preferences TLV was included in Hello Message sent by the LSR, and the method 600 then proceeds to block 614. Block 614 checks if the LDP-ID of the LSR is lower than the LDP-ID of the peering LSR. If the LDP-ID of the LSR is lower than the LDP-ID of the peering LSR, then the sent ordered list of transport preferences is the basis of negotiation for the transport protocol and the method 600 then proceeds to block 616. If the LDP-ID of the LSR is not lower than the LDP-ID of the peering LSR, then the received ordered list of transport preferences is the basis of negotiation for transport protocol and the method 600 then proceeds to block 618. Block 616 computes the common preferences by resetting the transport protocols in sent ordered list that do not exist in received ordered list, and then the method 600 then proceeds to block 620. Block 618 computes the common preferences by resetting the transport protocols in the received ordered list that do not exist in sent ordered list, and the method 600 then proceeds to block 620. Block 620 checks if there is no transport protocol in the common preferences. If there is no transport protocol in the common preferences, then the method 600 proceeds to block 624, otherwise the method 600 proceeds to 622. Block 624 declares that no connection is possible as transport preferences are mutually exclusive between the LSRs, and then the method terminates. Block 622 declares the first protocol in the common preferences as the negotiated transport protocol, and then the method terminates. It will be appreciated that, although primarily presented with respect to an example embodiment in which the default transport protocol that is used in the absence of a Transport Preferences TLV is TCP, any other suitable transport protocol may be used as the default transport protocol when the Transport Preferences TLV is not included in the received Hello Message. At block 699, the method 600 ends. It will be appreciated that, although the method 600 is based on the Transport Preferences TLV 200 of FIG. 2, the method 600 of FIG. 6 may be adapted for use of the Transport Preferences TLV 400 of FIG. 4 or any other suitable format for encoding of the transport protocol preferences.

In at least some example embodiments, negotiation of LDP as a user of the transport connection (namely, as the application data to be carried on the transport connection) may be supported. Namely, after a pair of LSRs negotiates the transport protocol to be used for the LDP session (e.g., based on method 500 of FIG. 5 and method 600 of FIG. 6), the LSRs establish a transport connection using the transport protocol. It will be appreciated that, during establishment of the transport connection, the endpoints of the connection may negotiate that the application data to be carried on the transport connection is LDP. It will be appreciated that the negotiation process may be specific to the transport protocol type such that, as discussed further below, the negotiation process may be different for different transport protocols (e.g., TCP, SCTP, QUIC, TLS, and the like).

In at least some example embodiments, in which TCP is selected as the transport protocol to be used to support LDP, negotiation of LDP as a user of the TCP connection may be supported. This negotiation may be performed based on the LDP specification by using TCP port 646 which is assigned for LDP. In terms of using the port number, an LSR listens to incoming connections requests on the TCP port (e.g., on TCP port 646), and the LSR that initiates the TCP connection sends the TCP connection request (and subsequent TCP messages) with the destination port in the TCP Header set to the TCP port (e.g., TCP port 646).

In at least some example embodiments, in which SCTP is selected as the transport protocol to be used to support LDP, negotiation of LDP as a user of the SCTP connection may be supported. In order to be able to carry LDP messages on an SCTP connection, a destination port field in the SCTP Header uses a unique port number to indicate that the payload of an SCTP packet is an LDP message. It will be appreciated that any suitable port number (e.g., any unused port number not currently being used for a different protocol) may be used. In one example, the port number that is used may be reserved in the Service Name and Transport Protocol Port Number Registry maintained by the IANA. For example, a new SCTP port number 646 may be used to indicate that the payload of the SCTP packet is an LDP packet. In one example, the port number that is used may be an unused alternate port number which may be used to indicate the payload as an LDP message. For example, a port number in SCTP may be administratively configured across the LSRs participating in LDP to indicate the payload as an LDP packet. In terms of using the port number, an LSR listens to incoming connections requests on the SCTP port (e.g., on SCTP port 646), and the LSR that initiates the SCTP connection sends the SCTP connection request (and subsequent SCTP packets) with the destination port in SCTP Header set to the SCTP port (e.g., SCTP port 646).

In at least some example embodiments, in which QUIC is selected as the transport protocol to be used to support LDP, negotiation of LDP as a user of the QUIC connection may be supported.

In general, QUIC was designed to transport application protocols only (e.g., Hypertext Transfer Protocol (HTTP) and so forth), since the key target application for QUIC is web traffic. As a result, there is no field in any of the QUIC headers that specifies the type of user protocols being carried. During QUIC connection set-up, the endpoints negotiate the application protocol that will be transported atop QUIC.

In some cases, QUIC may perform the application protocol negotiation by using the Application Layer Protocol Negotiation (ALPN) of Transport Layer Security (TLS) since QUIC embeds the TLS handshake during connection setup. As the name implies, ALPN is a TLS extension that introduces support for application protocol negotiation into the TLS handshake. ALPN is defined in RFC 7443. For instances in which multiple application protocols are supported over QUIC, this extension allows the application layer to negotiate which application protocol will be used over the QUIC connection.

In the ALPN process, a protocol negotiation extension may be used by label switched routers to negotiate protocol support during connection setup. An example protocol negotiation extension for the ALPN process is depicted as ALPN negotiation extension 710 of FIG. 7. In the TLS specification, the extension type ("application_layer_protocol_negotiation(16)"), which may be included by endpoints to negotiate application protocol support during connection set-up, is defined as shown in the ALPN negotiation extension 710 of FIG. 7. The "extension_data" field of the ("application_layer_protocol_negotiation(16)") extension includes a "ProtocolNameList" value. The "ProtocolNameList" contains the list of protocols advertised by the client, in descending order of preference. Protocols are named by IANA-registered, opaque, non-empty byte strings.

In the ALPN process, the client appends a new ProtocolNameList field, including the list of supported application protocols, in the connection set-up message, and the server inspects the ProtocolNameList field and returns a ProtocolName field indicating the selected protocol as part of its response. The server may respond with only a single protocol name, and if it does not support any of the protocols that the client requests, then it may choose to abort the connection. As a result, once the connection is complete, both the secure tunnel is established and the client and server are in agreement as to which application protocol will be used and, thus, the client and the server can begin communicating immediately. The currently supported application protocol names are as follows: (1) HTTP/1.1 [HTTP]=>"http/1.1", (2) SPDY/1 [SPDY/1]=>"spdy/1", (3) SPDY/2 [SPDY/2]=>"spdy/2", and (4) SPDY/3 [SPDY/3]=>"spdy/3".

In some cases, QUIC may perform protocol negotiation by using a Multi Layer Protocol Negotiation (MLPN) of TLS since QUIC embeds the TLS handshake during connection setup. The MLPN capability, based on negotiation performed between endpoints during connections setup, enables tunneling of any protocol at any communication protocol layer over a QUIC connection and also enables multiplexing of multiple protocols over a QUIC connection irrespective of the communication protocol layers of the multiple protocols. In at least some example embodiments, the MLPN capability may be used to send LDP messages on a QUIC connection.

In the MLPN process, a protocol negotiation extension may be used by label switched routers to negotiate protocol support during connection setup. An example protocol negotiation extension for the MLPN process is depicted as MLPN negotiation extension 720 of FIG. 7. For the MLPN capability, the extension type ("multi_layer_protocol_negotiation(20)"), which is included by endpoints to negotiate multi-protocol support during connection set-up, is defined as shown in the MLPN negotiation extension 720 of FIG. 7.

The "LayerName" includes the name of the protocol layer. Protocol layers are named by opaque, non-empty byte strings. Empty strings are not included and byte strings are not be truncated. The layer names may be defined as follows: (1) Data Link Layer="dlink", (2) Network Layer="network", (3) Transport Layer="transport", (4) Application layer protocols with standardized TCP ports="app/tcp", (5) Application layer protocols with standardized SCTP ports="app/sctp", and (6) Application layer protocols with standardized UDP ports="app/udp".

The "ProtocolList" includes a list of 16-bit values, where each value identifies a protocol. The value of the protocols is dependent on the layer for which the ProtocolList is applicable. The layer-wise values of protocols may be defined as follows. For "dlink", the following protocol values may be defined: Ethernet=1, PPP (Point-to-Point Protocol)=2, HDLC (High-Level Data Link Control)=3, IEEE 802.11 wireless LAN=4, LLDP (Link Layer Discovery Protocol)=LLDP=5, and Frame Relay=6. For "network", the standardized Ethertype values may be used (e.g., existing network layer protocols may be automatically applicable in this extension). For "transport", the standardized Protocol Type values may be used (e.g., existing transport protocols as well as other user protocols of the network layer may be automatically applicable in this extension). For "app/tcp", the standardized TCP port numbers of the application protocols may be used. For "app/udp", the standardized UDP port numbers of the application protocols may be used. For "app/sctp", the standardized SCTP port numbers [PORT-IANA] of the application protocols are to be used.

In the MLPN process during QUIC connection setup, the client sends a connection set-up message that includes a MultiLayerProtocolList including the list of protocols it intends to transport over the QUIC connection and the server inspects the MultiLayerProtocolList, resets the protocols that the server does not intend to support in the connection, and returns an updated MultiLayerProtocolList indicating the selected protocols as part of its response. If the server does not support any protocol that the client requests, then the server may choose to abort the connection. As a result, once the connection is complete, both the secure tunnel is established, and the client and server are in agreement as to which protocols will be used and, thus, the client and server can begin communicating immediately.

In the QUIC connection setup process, the handshake sends the following in the MLPN: Layer="app/tcp" and ProtocolList={646}. This means that the QUIC connection is requested for a traditional TCP based application that has been assigned TCP port 646, which is LDP. The pair of LSRs establishing the QUIC connection for LDP are be configured to negotiate for the Layer and ProtocolList values.

In at least some example embodiments, in which TLS is selected as the transport protocol to be used to support LDP, negotiation of LDP as a user of the TLS connection may be supported.

In general, TLS is a session layer protocol that runs atop TCP, which adds a security layer atop reliable transport of TCP for applications protocols. TLS was designed to securely transport application protocols only (e.g., Hypertext Transfer Protocol (HTTP) and so forth), since the key target application for TLS is web traffic. As a result, there is no field in any of the TLS headers that specifies the type of user protocols being carried. During TLS connection set-up, the endpoints negotiate the application protocol that will be transported atop TLS. As described before, TLS typically uses ALPN process to negotiate the application protocol that is to be transported on a connection.

In some cases, TLS may perform protocol negotiation by using an MLPN capability during connection setup. The MLPN capability, based on negotiation performed between endpoints during connections setup, enables tunneling of any protocol at any communication protocol layer over a TLS connection and also enables multiplexing of multiple protocols over a TLS connection irrespective of the communication protocol layers of the multiple protocols. In at least some example embodiments, the MLPN capability may be used to send LDP messages on a TLS connection.

In the TLS connection set-up process, the handshake sends the following in the MLPN: Layer="app/tcp" and ProtocolList={646}. This means that the TLS connection is requested for a traditional TCP based application that has been assigned TCP port 646, which is LDP. The pair of LSRs establishing the TLS connection for LDP are be configured to negotiate for the Layer and ProtocolList values.

It will be appreciated, at least from the discussion above, that FIG. 7 depicts example embodiments of protocol negotiation extensions in a transport protocol (e.g., QUIC as discussed above, TLS as discussed above, or the like) which may be used by label switched routers to negotiate payload protocol type (e.g., LDP or the like) support during connection setup.

It will be appreciated that, although primarily presented herein with respect to example embodiments in which negotiation of LDP as a user of the transport connection (namely, as the application data to be carried on the transport connection) is supported using specific types of negotiation for specific transport protocols (e.g., message types, fields, values, and so forth), negotiation of LDP as a user of the transport connection may be supported using various other types of negotiation for various transport protocols (e.g., other message types, other fields, other field values, or the like, as well as various combinations thereof).

It will be appreciated that, although primarily presented with respect to example embodiments in which both LSRs in a pair of peering LSRs support negotiation of the transport protocol for supporting the LDP (and, thus, each LSR in the pair of peering LSRs includes the Transport Preferences TLV in Hello messages that are exchanged), there may be cases in which only one of the two LSRs in the pair of peering LSRs supports negotiation of the transport protocol for supporting the LDP while the other of the two LSRs in the pair of peering LSRs supports a legacy LDP implementation. In a pair of peering LSRs, if the first LSR includes a Transport Preferences TLV in an Hello Messages sent to a second LSR, but the Hello Message received by the first LSR from the second LSR does not include a Transport Preferences TLV, the first LSR may assume that the second LSR intends to use TCP to support the LDP (e.g., the first LSR may treat the absence of the Transport Preferences TLV as an imaginary Transport Preferences TLC that only lists TCP as the transport protocol to be supported). In this case, if the first LSR has encoded TCP as an option in the Transport Preferences TLV that is sent to the second LSR, then TCP may be used for peering between the LSRs and the LSRs will establish a TCP connection for supporting an LDP peering session. In this case, if the first LSR has not encoded TCP as an option in the Transport Preferences TLV that it sent to the second LSR, then there are no common transport protocol choices among the LSRs and, thus, peering between the LSRs is not possible. In that situation in which peering between the LSRs is not possible, if the second LSR sends a TCP connection request to first LSR then the first LSR should reject the connection. It will be appreciated that such capabilities ensure backward compatibility of negotiation of the transport protocol for supporting LDP as presented herein with legacy LDP implementations in which negotiation of the transport protocol for supporting LDP may not be supported.

It will be appreciated that, if after an LDP session has become operational over the chosen transport protocol and an LSR detects that the peering LSR has modified the transport protocol preferences in its Hello Messages, then the LSR will reevaluate the transport protocol preferences. If after reevaluation the newly chosen transport protocol is different than the currently active transport protocol, then the newly chosen transport protocol may not be put into effect immediately and may be put into effect after the current LDP session is terminated (e.g., due to operational failures, administrative action, or the like) and a new LDP session is established (e.g., at which time a new transport connection of the newly chosen transport protocol is established for supporting the new LDP session between the LSRs).

The LSRs may be configured to select, based on analysis of the transport protocol preferences, a transport protocol for use in supporting use of LDP. In at least some example embodiments, when a first LSR receives a Hello message from a second LSR that includes transport protocol preferences, then the first LSP selects a transport protocol based on the highest common preference with respect to the transport protocol preferences of the LSR with the lower LDP-ID. This may be further understood with respect to the following two examples. In these examples, assume that the LDP-ID of the first LSR is lower than the LDP-ID of the second LSR.

In a first example, assume that the first LSR sends {QUIC, SCTP, TCP} in its Hello Messages and receives {SCTP, QUIC, TCP} in the Hello Messages from second LSR. In this example, all of the listed protocols are common between the two LSRs. In this example, since the first LSR has the lower LDP-ID, the set of common preferences with respect to its transport protocol preferences is {QUIC, SCTP, TCP}. As a result, QUIC will be chosen by both LSRs for setting up the LDP session.

In a second example, assume that the first LSR sends {QUIC, SCTP, TCP} in its Hello Messages and receives {SCTP, TCP} in the Hello Messages from second LSR. In this example, since the first LSR has the lower LDP-ID, the set of common preferences with respect to its transport protocol preferences is {SCTP, TCP}. As a result, SCTP will be chosen by both LSRs for setting up the LDP session.

It will be appreciated that, although primarily presented herein with respect to example embodiments in which the transport protocol preferences of the LSR having the lower LDP-ID controls the selection of the transport protocol to be used for the LDP session, in at least some example embodiments, the transport protocol preferences of the LSR having the higher LDP-ID may control the selection of the transport protocol to be used for the LDP session.

The LSRs, after selection of the transport protocol for use in supporting LDP, may be configured to use the transport protocol to support use of LDP between the LSRs. The LSRs may be configured to use the transport protocol to establish a transport connection between the LSRs, where the transport connection between the LSRs may be used to support an LDP session between the LSRs. The LSRs may be configured to use the transport connection between the LSRs to support establishment of an LDP session between the LSRs. The LSRs may be configured to use the LDP session between the LSRs (and, thus, the transport connection between the LSRs) to support label distributions based on LDP. The LSRs, after selection of the transport protocol for use in supporting LDP, may be configured to use the transport protocol to support use of LDP between the LSRs for supporting various other functions.

It will be appreciated that various functions, including selection of the transport protocol for use in supporting LDP between a pair of LSRs and use of the selected transport protocol to support use of LDP between the pair of LSRs, may be further understood by way of reference to FIG. 8.

FIG. 8 depicts an example embodiment of a method for use by a communication device to support use of a selected transport protocol to support a label distribution protocol in a label switching network. It will be appreciated that, although primarily presented as being performed serially, at least a portion of the functions of method 800 may be performed contemporaneously or in a different order than as presented with respect to FIG. 8.

At block 801, the method 800 begins.

At block 810, support, by a first label switched router based on negotiation with a second label switched router, selection of a transport protocol to be used between the first label switched router and the second label switched router to support a label distribution protocol between the first label switched router and the second label switched router. In at least some example embodiments, supporting selection of the transport protocol includes supporting, by the first label switched router, communication of an indication of a set of transport protocols available for supporting the label distribution protocol between the first label switched router and the second label switched router. In at least some example embodiments, the indication of the set of transport protocols includes a list of the transport protocols available for supporting the label distribution protocol between the first label switched router and the second label switched router. In at least some example embodiments, the list of transport protocols available for supporting the label distribution protocol between the first label switched router and the second label switched router is configured to indicate a prioritized ordering of the transport protocols available for supporting the label distribution protocol between the first label switched router and the second label switched router. In at least some example embodiments, the indication of the set of transport protocols is included within a type-length-value (TLV) including a set of transport element fields encoding respective indications of the respective transport protocols available for supporting the label distribution protocol between the first label switched router. In at least some example embodiments, the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router. In at least some example embodiments, the indication of the set of transport protocols is included within a type-length-value (TLV) including a field that includes the bit string. In at least some example embodiments, the indication of the set of transport protocols is communicated within an adjacency message of the label distribution protocol. In at least some example embodiments, supporting communication of the indication of the set of transport protocols available for supporting the label distribution protocol between the first label switched router and the second label switched router includes sending, by the first label switched router toward the second label switched router, an indication of a set of transport protocols available at the first label switched router for supporting the label distribution protocol between the first label switched router and the second label switched router. In at least some example embodiments, supporting communication of the indication of the set of transport protocols available for supporting the label distribution protocol between the first label switched router and the second label switched router includes receiving, by the first label switched router from the second label switched router, an indication of a set of transport protocols available at the second label switched router for supporting the label distribution protocol between the first label switched router and the second label switched router. In at least some example embodiments, supporting selection of the transport protocol includes selecting, by the first label switched router based on a set of transport protocols supported by the first label switched router and a set of transport protocols supported by the second label switched router, the transport protocol to be used between the first label switched router and the second label switched router to support the label distribution protocol between the first label switched router and the second label switched router. In at least some example embodiments, the transport protocol to be used between the first label switched router and the second label switched router is selected, from a set of common transport protocols supported by the first label switched router and the second label switched router, as a highest priority transport protocol indicated by one of the first label switched router or the second label switched router having a lower label distribution protocol identifier. In at least some example embodiments, selecting the transport protocol includes determining, by the first label switched router based on the set of transport protocols supported by the first label switched router and the set of transport protocols supported by the second label switched router, a set of common transport protocols supported by the first label switched router and the second label switched router and determining, by the first label switched router based on the set of common transport protocols supported by the first label switched router and the second label switched router, the transport protocol to be used between the first label switched router and the second label switched router to support the label distribution protocol between the first label switched router and the second label switched router. In at least some example embodiments, determining the transport protocol includes determining, by the first label switched router based on a first router identifier of the first label switched router and a second router identifier of the second label switched router, a label switched router having a lower label distribution protocol identifier and determining, from the set of common transport protocols supported by the first label switched router and the second label switched router, a highest priority transport protocol of the label switched router having the lower label distribution protocol identifier. At block 820, support, by the first label switched router using the transport protocol, use of the label distribution protocol between the first label switched router and the second label switched router. In at least some example embodiments, supporting use of the label distribution protocol between the first label switched router and the second label switched router includes supporting, by the first label switched router using the transport protocol, establishment of a transport connection between the first label switched router and the second label switched router. In at least some example embodiments, supporting establishment of the transport connection between the first label switched router and the second label switched router includes negotiating, by the first label switched router during the establishment of the transport connection, that application data to be transported on the transport connection includes label distribution protocol data of the label distribution protocol. In at least some example embodiments, negotiating that the application data to be transported on the transport connection includes label distribution protocol data of the label distribution protocol includes supporting use of a transport protocol port number that is assigned for the transport protocol to indicate use of the label distribution protocol. In at least some example embodiments, supporting use of the label distribution protocol between the first label switched router and the second label switched router includes supporting, by the first label switched router using a transport connection of the transport protocol and based on the label distribution protocol, establishment of a label distribution protocol session between the first label switched router and the second label switched router. In at least some example embodiments, supporting establishment of the label distribution protocol session between the first label switched router and the second label switched router includes supporting, by the first label switched router using the transport connection and based on the label distribution protocol, communication of a label distribution session establishment message of the label distribution protocol. In at least some example embodiments, supporting use of the label distribution protocol between the first label switched router and the second label switched router includes supporting, by the first label switched router using a transport connection of the transport protocol and based on a label distribution protocol session established between the first label switched router and the second label switched router based on the label distribution protocol, communication of a label distribution session message of the label distribution protocol between the first label switched router and the second label switched router. In at least some example embodiments, supporting use of the label distribution protocol between the first label switched router and the second label switched router includes supporting, by the first label switched router on a transport connection of the transport protocol, a set of streams of the transport connection, the set of streams of the transport connection configured to transport a respective set of label distribution protocol sessions of the label distribution protocol. In at least some example embodiments, the label distribution protocol sessions of the label distribution protocol are associated with respective feature sets to be supported between the first label switched router and the second label switched router. In at least some example embodiments, the feature sets to be supported between the first label switched router and the second label switched router are associated with respective Forwarding Equivalence Classes (FECs). In at least some example embodiments, supporting use of the label distribution protocol between the first label switched router and the second label switched router includes supporting, by the first label switched router on a transport connection of the transport protocol, a first stream configured to transport a first label distribution protocol session associated with a first set of features to be supported between the first label switched router and the second label switched router and supporting, by the first label switched router on the transport connection, a second stream configured to transport a second label distribution protocol session associated with a second set of features to be supported between the first label switched router and the second label switched router.

At block 899, the method 800 ends.

It will be appreciated that various functions presented herein with respect to FIGS. 1-7 may be incorporated within the context of method 800 of FIG. 8.

It will be appreciated that, although primarily presented herein with respect to example embodiments in which particular transport protocols (e.g. TCP, SCTP, QUIC, and TLS) are used to support a particular label distribution protocol (e.g., LDP), it will be appreciated that various other transport protocols may be used to support various label distribution protocols, that various transport protocols may be used to support various other label distribution protocols, or the like, as well as various combinations thereof.

It will be appreciated that, although primarily presented herein with respect to example embodiments in which particular protocols at a particular communication protocol layer are used to support a particular type of protocol at a particular communication protocol layer, various example embodiments presented herein may be used or adapted for use to enable various protocols at a various communication protocol layers to be used to support various types of protocols at various communication protocol layers.

Various example embodiments for supporting selection of a transport protocol for use in supporting a label distribution protocol in a label switching network may provide various advantages or potential advantages.

For example, various example embodiments for supporting selection of a transport protocol for use in supporting a label distribution protocol in a label switching network may enable LDP sessions to use transport protocols other than TCP (e.g., SCTP, QUIC, TLS, or the like) for reliable delivery of messages, since there may be various potential shortcoming associated with the efficiency, throughput, and scalability of LDP messages over TCP-based transport connections which can negatively impact the setup times and/or rerouting times of LSPs (where it will be appreciated that such times are a critical factor in faster convergence of the LSPs).

For example, various example embodiments for supporting selection of a transport protocol for use in supporting a label distribution protocol in a label switching network may enable LDP sessions to use transport protocols other than TCP (e.g., SCTP, QUIC, TLS, or the like) for reliable delivery of messages in a manner which improves efficiency of transport of LDP messages over the transport connections. For example, there are several advanced reliable transport protocols which are more efficient than TCP, such as QUIC, SCTP, and the like. For example, QUIC is a transport protocol that provides reduced connection set-up time, reduced transport latency, and bandwidth estimation in each direction to avoid congestion. QUIC is a user space transport protocol (TCP runs in kernel of the operating system), which allows rapid protocol revision without having to wait for system upgrades and allows custom congestion control algorithms as suitable to the needs of the application. QUIC is equipped with in-built security, so it can transport application traffic with encryption and authentication. Various example embodiments presented herein enable use of such other transport protocols to support LDP between LSRs in a manner supporting improved efficiency.

For example, various example embodiments for supporting selection of a transport protocol for use in supporting a label distribution protocol in a label switching network may enable LDP sessions to use transport protocols other than TCP (e.g., SCTP, QUIC, TLS, or the like) for reliable delivery of messages in a manner which improves throughput of transport of LDP messages over the transport connections. For example, there may be many FEC types supported in LDP (e.g., an LDP session can set up various types of LSPs, each type serving a different purpose/application and requiring differing levels of priority over setup time or rerouting time of its LSPs. Additionally, FEC types exchanged over an LDP session are independent of each other. Since, label mapping for all FEC types are exchanged over a common underlying TCP connection, this may cause HOL blocking delays for every other FEC type if TCP packets for one FEC type is delayed (due to congestion) or lost. Various example embodiments presented herein enable use of such other transport protocols to support LDP between LSRs in a manner tending to avoid such throughput problems.

For example, various example embodiments for supporting selection of a transport protocol for use in supporting a label distribution protocol in a label switching network may enable LDP sessions to use transport protocols other than TCP (e.g., SCTP, QUIC, or the like) for reliable delivery of messages in a manner which improves scalability of transport of LDP messages over the transport connections. It will be appreciated that, while various limitations to support for multiple FEC types and feature sets by TCP connections as discussed above could be overcome by setting up separate LDP sessions (and TCP connections) for each FEC type, this generally is not a scalable solution since support for N FEC types would require N LDP sessions/TCP connections. For example, if an LSR supports 12 FEC types and has 50 neighbor LSRs, then it would need 12×50=600 LDP sessions and associated TCP connections. More advanced protocols, like QUIC or SCTP, improve performance of applications by establishing a number of multiplexed sub-connections (called streams) over a single connection. The concept of streams allows multiple streams of data to reach an endpoint of the connection independently and, thus, independent of packet losses or delays involving other streams. This solves the HOL blocking delays as experienced in TCP, if any of the TCP packets are delayed or lost. Thus, it will be appreciated that such multi-streaming transport protocols support fate separation of FEC types in LDP since each FEC type can be assigned an independent stream to exchange label mappings of its LSPs.

Various example embodiments supporting multiple transport options for supporting selection of a transport protocol for use in supporting a label distribution protocol in a label switching network may provide various other advantages or potential advantages.

Figure 9:
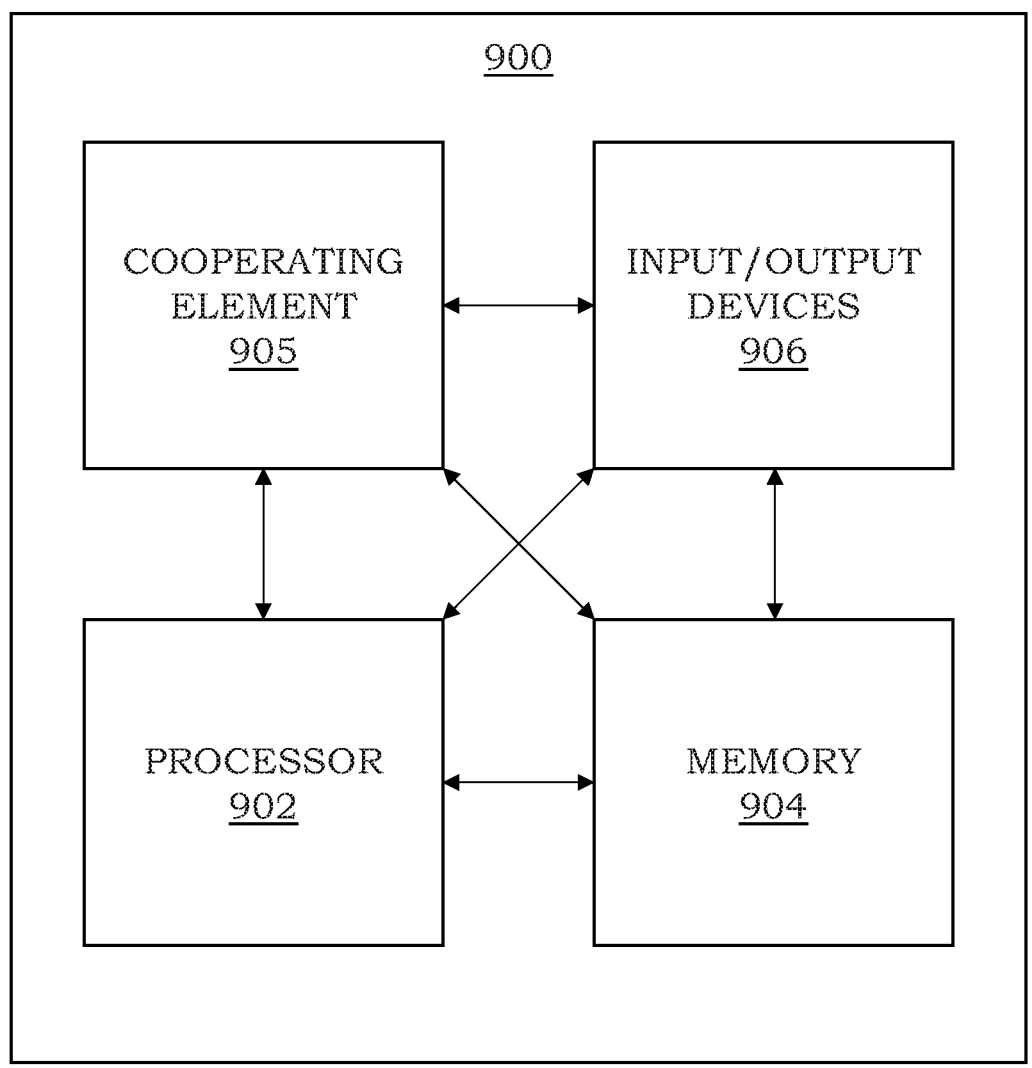
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a central processing unit (CPU), a processor, a processor having a set of processor cores, a processor core of a processor, or the like) and a memory 904 (e.g., a random access memory, a read only memory, or the like). The processor 902 and the memory 904 may be communicatively connected. In at least some example embodiments, the computer 900 may include at least one processor and at least one memory including computer program code, wherein the at least one memory and the computer program code are configured to, with the at least one processor, cause the computer to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer-readable storage medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      determine, by a first label switched router based on negotiation with a second label switched router, a set of supported transport protocols supported by both the first label switched router and the second label switched router for supporting a label distribution protocol between the first label switched router and the second label switched router;
      select, by the first label switched router based on the set of supported transport protocols, a selected transport protocol; and
      support, by the first label switched router using the selected transport protocol, use of the label distribution protocol between the first label switched router and the second label switched router.

2. The apparatus of claim 1, wherein, to determine the set of supported transport protocols, the at least one memory and the computer program code are configured to, with the at least one processor, cause the apparatus to at least:
   support, by the first label switched router, communication of an indication of a set of transport protocols available for supporting the label distribution protocol between the first label switched router and the second label switched router.

3. The apparatus of claim 2, wherein the indication of the set of transport protocols includes a list of the transport protocols available for supporting the label distribution protocol between the first label switched router and the second label switched router.

4. The apparatus of claim 3, wherein the list of transport protocols available for supporting the label distribution protocol between the first label switched router and the second label switched router is configured to indicate a prioritized ordering of the transport protocols available for supporting the label distribution protocol between the first label switched router and the second label switched router.

5. The apparatus of claim 2, wherein the indication of the set of transport protocols is included within a type-length-value (TLV) including a set of transport element fields encoding respective indications of the respective transport protocols available for supporting the label distribution protocol between the first label switched router.

6. The apparatus of claim 2, wherein the indication of the set of transport protocols includes a bit string having a set of bits representing a respective set of potential transport protocols, wherein the bits of the bit string are set in a manner indicative of the transport protocols available for supporting the label distribution protocol between the first label switched router and the second label switched router.

7. The apparatus of claim 6, wherein the indication of the set of transport protocols is included within a type-length-value (TLV) including a field that includes the bit string.

8. The apparatus of claim 2, wherein the indication of the set of transport protocols is communicated within an adjacency message of the label distribution protocol.

9. The apparatus of claim 2, wherein, to support communication of the indication of the set of transport protocols available for supporting the label distribution protocol between the first label switched router and the second label switched router, the at least one memory and the computer program code are configured to, with the at least one processor, cause the apparatus to at least:
send, by the first label switched router toward the second label switched router, an indication of a set of transport protocols available at the first label switched router for supporting the label distribution protocol between the first label switched router and the second label switched router.

10. The apparatus of claim 2, wherein, to support communication of the indication of the set of transport protocols available for supporting the label distribution protocol between the first label switched router and the second label switched router, the at least one memory and the computer program code are configured to, with the at least one processor, cause the apparatus to at least:
receive, by the first label switched router from the second label switched router, an indication of a set of transport protocols available at the second label switched router for supporting the label distribution protocol between the first label switched router and the second label switched router.

11. The apparatus of claim 1, wherein the selected transport protocol is a highest priority transport protocol in the set of supported transport protocols.

12. The apparatus of claim 11, wherein the highest priority transport protocol in the set of supported transport protocols is determined based on a first label distribution protocol identifier of the first label switched router and a second label distribution protocol identifier of the second label switched router.

13. The apparatus of claim 12, wherein the highest priority transport protocol in the set of supported transport protocols is a highest priority transport protocol supported by one of the first label switched router or the second label switched router that has a lower associated label distribution protocol identifier.

14. The apparatus of claim 1, wherein, to select the selected transport protocol, the at least one memory and the computer program code are configured to, with the at least one processor, cause the apparatus to at least:
determine, by the first label switched router based on whether a first router identifier of the first label switched router or a second router identifier of the second label switched router has a lower value, whether the first label switched router or the second label switched router is a higher priority label switched router; and
select, from the set of supported transport protocols, a highest priority transport protocol of the higher priority label switched router.

15. The apparatus of claim 1, wherein, to support use of the label distribution protocol between the first label switched router and the second label switched router, the at least one memory and the computer program code are configured to, with the at least one processor, cause the apparatus to at least:
support, by the first label switched router using the selected transport protocol, establishment of a transport connection between the first label switched router and the second label switched router.

16. The apparatus of claim 15, wherein, to support establishment of the transport connection between the first label switched router and the second label switched router, the at least one memory and the computer program code are configured to, with the at least one processor, cause the apparatus to at least:
negotiate, by the first label switched router during the establishment of the transport connection, that application data to be transported on the transport connection includes label distribution protocol data of the label distribution protocol.

17. The apparatus of claim 16, wherein, to negotiate that the application data to be transported on the transport connection includes label distribution protocol data of the label distribution protocol, the at least one memory and the computer program code are configured to, with the at least one processor, cause the apparatus to at least:
support use of a transport protocol port number that is assigned for the selected transport protocol to indicate use of the label distribution protocol.

18. The apparatus of claim 1, wherein, to support use of the label distribution protocol between the first label switched router and the second label switched router, the at least one memory and the computer program code are configured to, with the at least one processor, cause the apparatus to at least:
support, by the first label switched router using a transport connection of the selected transport protocol and based on the label distribution protocol, establishment of a label distribution protocol session between the first label switched router and the second label switched router.

19. The apparatus of claim 18, wherein, to support establishment of the label distribution protocol session between the first label switched router and the second label switched router, the at least one memory and the computer program code are configured to, with the at least one processor, cause the apparatus to at least:
support, by the first label switched router using the transport connection and based on the label distribution protocol, communication of a label distribution session establishment message of the label distribution protocol.

20. The apparatus of claim 1, wherein, to support use of the label distribution protocol between the first label switched router and the second label switched router, the at least one memory and the computer program code are configured to, with the at least one processor, cause the apparatus to at least:
support, by the first label switched router using a transport connection of the selected transport protocol and based on a label distribution protocol session established between the first label switched router and the second label switched router based on the label distribution protocol, communication of a label distribution session message of the label distribution protocol between the first label switched router and the second label switched router.

21. The apparatus of claim 1, wherein, to support use of the label distribution protocol between the first label switched router and the second label switched router, the at least one memory and the computer program code are configured to, with the at least one processor, cause the apparatus to at least:
support, by the first label switched router on a transport connection of the selected transport protocol, a set of streams of the transport connection, the set of streams of the transport connection configured to transport a respective set of label distribution protocol sessions of the label distribution protocol.

22. The apparatus of claim 21, wherein the label distribution protocol sessions of the label distribution protocol are associated with respective feature sets to be supported between the first label switched router and the second label switched router.

23. The apparatus of claim 22, wherein the feature sets to be supported between the first label switched router and the second label switched router are associated with respective Forwarding Equivalence Classes (FECs).

24. The apparatus of claim 1, wherein, to support use of the label distribution protocol between the first label switched router and the second label switched router, the at least one memory and the computer program code are configured to, with the at least one processor, cause the apparatus to at least:
support, by the first label switched router on a transport connection of the selected transport protocol, a first stream configured to transport a first label distribution protocol session associated with a first set of features to be supported between the first label switched router and the second label switched router; and
support, by the first label switched router on the transport connection of the selected transport protocol, a second stream configured to transport a second label distribution protocol session associated with a second set of features to be supported between the first label switched router and the second label switched router.

25. The apparatus of claim 1, wherein the selected transport protocol includes a Transmission Control Protocol (TCP), a Stream Control Transmission Protocol (SCTP), a QUIC protocol, or a Transport Layer Security (TLS) protocol.

26. The apparatus of claim 1, wherein the label distribution protocol includes a Label Distribution Protocol (LDP).

27. A method, comprising:
determining, by a first label switched router based on negotiation with a second label switched router, a set of supported transport protocols supported by both the first label switched router and the second label switched router for supporting a label distribution protocol between the first label switched router and the second label switched router;
selecting, by the first label switched router based on the set of supported transport protocols, a selected transport protocol; and
supporting, by the first label switched router using the selected transport protocol, use of the label distribution protocol between the first label switched router and the second label switched router.

28. An apparatus, comprising:
at least one processor; and
at least one memory including computer program code;
wherein the at least one memory and the computer program code are configured to, with the at least one processor, cause the apparatus to at least:
send, by a first router toward a second router, a first prioritized list of transport protocols supported by the first router for supporting use of a label distribution protocol between the first router and the second router;
receive, by the first router from the second router, a second prioritized list of transport protocols supported by the second router for supporting use of the label distribution protocol between the first router and the second router; and
select, by the first router based on the first prioritized list of transport protocols and the second prioritized list of transport protocols, a selected transport protocol for supporting use of the label distribution protocol between the first router and the second router.

* * * * *